(12) United States Patent
Ishii et al.

(10) Patent No.: US 7,605,971 B2
(45) Date of Patent: Oct. 20, 2009

(54) PLURALITY OF HIDDEN HINGES FOR MIRCROMIRROR DEVICE

(75) Inventors: Fusao Ishii, Menlo Park, CA (US);
Yoshihiro Maeda, Hachioji (JP);
Hirotoshi Ichikawa, Hachioji (JP)

(73) Assignees: Silicon Quest Kabushiki-Kaisha (JP);
Olympus Corporation (JP)

( * ) Notice: Subject to any disclaimer, the term of this patent is extended or adjusted under 35 U.S.C. 154(b) by 0 days.

(21) Appl. No.: 11/894,246

(22) Filed: Aug. 18, 2007

(65) Prior Publication Data

US 2007/0285756 A1    Dec. 13, 2007

Related U.S. Application Data

(63) Continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/841,173, filed on Aug. 30, 2006.

(51) Int. Cl.
*G02B 26/00* (2006.01)

(52) U.S. Cl. ...................... 359/291; 359/290

(58) Field of Classification Search ................. 359/223, 359/224, 238, 290, 291
See application file for complete search history.

(56) References Cited

U.S. PATENT DOCUMENTS

| | | | | |
|---|---|---|---|---|
| 5,099,353 | A | * | 3/1992 | Hornbeck ................... 359/291 |
| 5,504,614 | A | * | 4/1996 | Webb et al. ................. 359/223 |
| 5,936,760 | A | | 8/1999 | Choi et al. |
| 6,128,121 | A | | 10/2000 | Choi et al. |
| 7,068,417 | B2 | | 6/2006 | Yang |
| 7,233,428 | B2 | | 6/2007 | Yang |
| 7,245,415 | B2 | * | 7/2007 | Pan ............................ 359/291 |
| 2002/0185699 | A1 | * | 12/2002 | Reid .......................... 257/414 |
| 2005/0157375 | A1 | * | 7/2005 | Doan et al. ................. 359/291 |
| 2007/0001542 | A1 | * | 1/2007 | Neidrich ..................... 310/309 |
| 2007/0030436 | A1 | * | 2/2007 | Sasabayashi ................ 349/153 |

* cited by examiner

*Primary Examiner*—Timothy J Thompson
(74) *Attorney, Agent, or Firm*—Bo-In Lin

(57) ABSTRACT

A mirror device comprises plural mirror elements, each of which comprises a mirror for reflecting illumination light emitted from a light source, a hinge for supporting the mirror placed on a substrate, a hinge structural body for supporting the hinge, and electrodes for controlling a deflection direction of the mirror placed on the substrate, and in each of which the hinge is placed so as to traverse the edge of the mirror or the border with an adjacent mirror. Also enabled is a configuration of a projection apparatus, which comprises the mirror device.

10 Claims, 18 Drawing Sheets

Cross Section C-C'

Cross Section D-D'

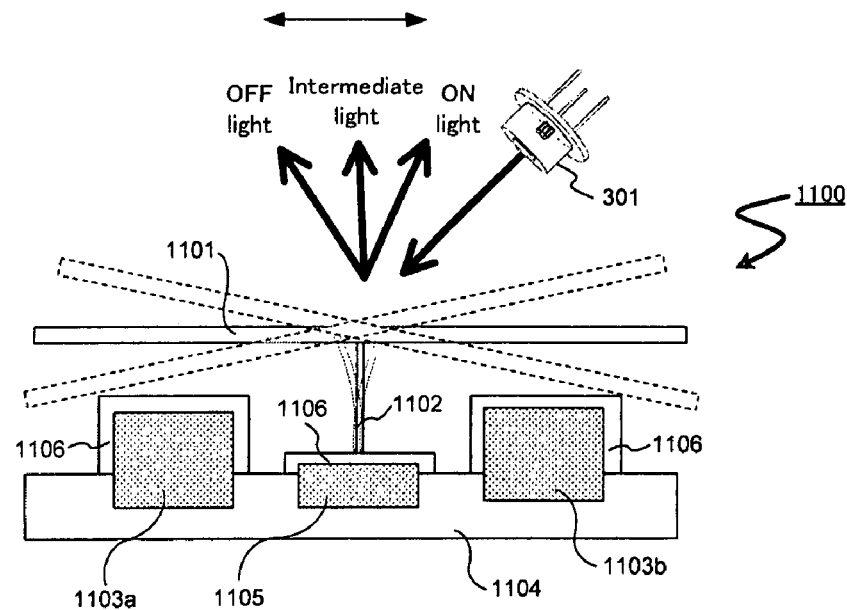
Fig. 12A
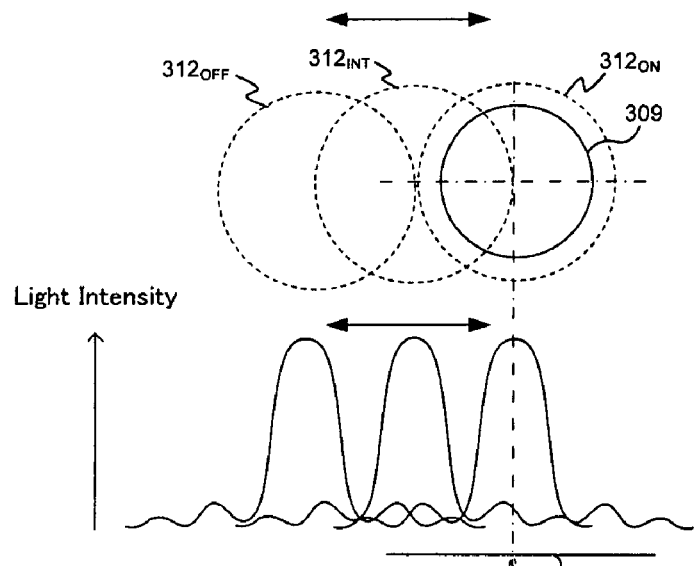
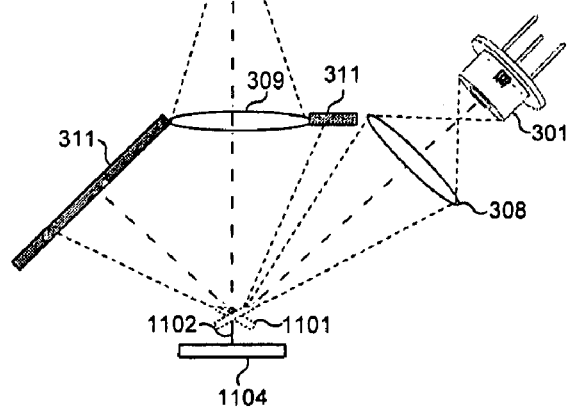
Fig. 12B

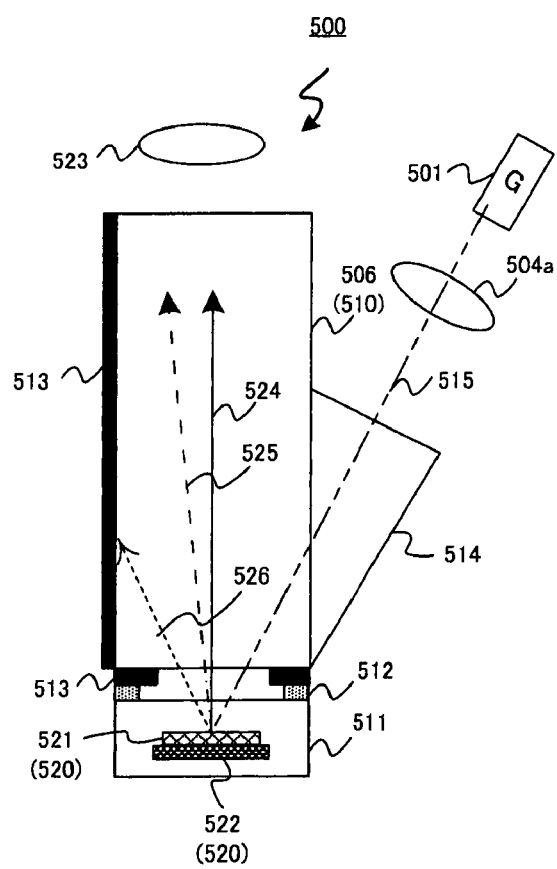
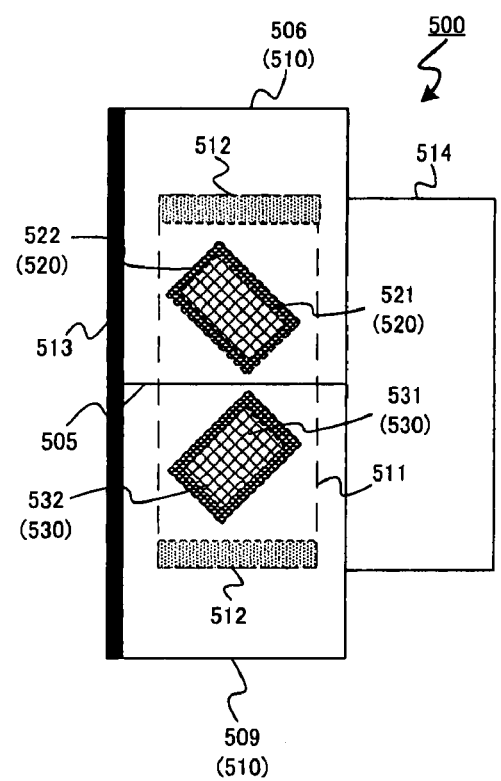
Fig. 14C
Fig. 14D

US 7,605,971 B2

PLURALITY OF HIDDEN HINGES FOR MIRCROMIRROR DEVICE

CROSS REFERENCE TO RELATED APPLICATIONS

This application is a Non-provisional Application of a Provisional Application 60/841,173 filed on Aug. 30, 2006. The Provisional Application 60/839,637 is a Continuation in Part (CIP) Application of a U.S. patent application Ser. No. 11/121,543 filed on May 4, 2005 now U.S Pat. No. 7,268,932. The application Ser. No. 11/121,543 is a Continuation in part (CIP) Application of three previously filed Applications. These three Applications are Ser. No. 10/698,620 filed on Nov. 1, 2003, Ser. No. 10/699,140 filed on Nov. 1, 2003 now U.S. Pat. No. 6,862,127, and Ser. No. 10/699,143 filed on Nov. 1, 2003 now U.S. Pat. No. 6,903,860 by one of the Applicants of this Patent Application. The disclosures made in these Patent Applications are hereby incorporated by reference in this Patent Application.

BACKGROUND OF THE INVENTION

1. Field of the Invention

The present invention relates to a mirror device for modulating light and in particular to a hinge of a mirror element constituting the mirror device. It also related to a Projection apparatus comprising a mirror device of the present invention.

2. Description of the Related Art

Even though there are significant advances of the technologies for implementing an electromechanical mirror device as a spatial light modulator (SLM) in recent years, there are still limitations and difficulties when it is employed to provide a high quality image. Specifically, when the images are digitally controlled, the image quality is adversely affected due to the fact that the images are not displayed with sufficient number of gray scales.

An electromechanical mirror device is drawing a considerable interest as a spatial light modulator (SLM). The electromechanical mirror device consists of a "mirror array" arranging a large number of mirror elements. In general, the mirror elements ranging from 60,000 to several millions of pieces are arranged on a surface of a substrate in an electromechanical mirror device.

Referring to FIG. 1A, an image display system 1 including a screen 2 is disclosed in a reference U.S. Pat. No. 5,214,420. A light source 10 is used for generating light energy for illuminating the screen 2. The generated light 9 is further concentrated and directed toward a lens 12 by a mirror 11. Lenses 12, 13 and 14 form a beam columnator operative to columnate light 9 into a column of light 8. A spatial light modulator (SLM) 15 is controlled on the basis of data input by a computer 19 via a bus 18 and selectively redirects the portions of light from a path 7 toward an enlarger lens 5 and onto screen 2. The SLM 15 has a mirror array arranging switchable reflective elements 17, 27, 37, and 47 being consisted of a mirror 33 connected by a hinge 30 on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge on the screen 2 so as to form an illuminated pixel 3. When the element 17 is in another position, the light is not redirected toward screen 2 and hence the pixel 3 is dark.

Each of mirror elements constituting a mirror device is to function as spatial light modulator (SLM) and each mirror element comprises a mirror and electrodes. A voltage applied to the electrode(s) generates a coulomb force between the mirror and the electrode(s), thereby making it possible to control and incline the mirror, and the mirror is "deflected" according to a common term used in this specification for describing the operational condition of a mirror element.

When a mirror is deflected by a voltage applied to the electrode(s) for controlling the mirror, the deflected mirror also changes the direction of the reflected light in reflecting an incident light. The direction of the reflected light is changed in accordance with the deflection angle of the mirror. The present specification refers to a state of the mirror when a light of which almost the entirety of an incident light is reflected to a projection path designated for image display as an "ON light", while it refers to a light reflected to a direction other than the designated projection path for image display as an "OFF light".

And a state of the mirror that reflects the light of an incident light in a manner that the ratio of the light, which is reflected to a projection path (i.e., the ON light), to that which is reflected so as to shift from the projection path (i.e., the OFF light) is referred to as a specific ratio. And that the light reflected to the projection path with a smaller quantity of light than the state of the ON light is referred to as an "intermediate light".

The terminology of present specification defines an angle of rotation along a clockwise (CW) direction as a positive (+) angle and that of counterclockwise (CCW) direction as negative (−) angle. A deflection angle is defined as zero degree (0°) when the mirror is in the initial state, as a reference of mirror deflection angle.

Most of the conventional image display devices such as the devices disclosed in a U.S. Pat. No. 5,214,420 implements a dual-state mirror control that controls the mirrors in a state of either ON or OFF. The quality of an image display is limited due to the limited number of gray scales. Specifically, in a conventional control circuit that applies a PWM (Pulse Width Modulation), the quality of the image is limited by the LSB (least significant bit) or the least pulse width as control related to the ON or OFF state. Since the mirror is controlled to operate in either the ON or OFF state, the conventional image Projection apparatus has no way to provide a pulse width for controlling the mirror that is shorter than the control duration allowable on the basis of the LSB. The least quantity of light, which is determined on the basis of the gray scale, is the light reflected during the time duration based on the least pulse width. The limited number of gray scales leads to a degradation of the image.

Specifically, FIG. 1C exemplifies a control circuit for controlling a mirror element according to the disclosure in the U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based on a Static Random Access switch Memory (SRAM) design. The transistor M9 connected to a Row-line receives a DATA signal via a Bit-line. The memory cell 32-written data is accessed when the transistor M9 that has received the ROW signal on a Word-line is turned on. The latch 32a consists of two cross-coupled inverters, i.e., M5/M6 and M7/M8, which permit two stable states, that is, a state 1 is Node A high and Node B low, and a state 2 is Node A low and Node B high.

The mirror is driven by a voltage applied to the address electrode abutting an address electrode and is held at a predetermined deflection angle on the address electrode. An elastic "landing chip" is formed at a portion on the address electrode, which makes the address electrode contact with mirror, and assists the operation for deflecting the mirror toward the opposite direction when a deflection of the mirror is switched. The landing chip is designed as having the same potential with the address electrode, so that a shorting is prevented when the address electrode is in contact with the mirror.

Each mirror formed on a device substrate has a square or rectangular shape and each side has a length of 10 to 15 μm. However, in this configuration, an unexpected reflected light for projecting image is generated by reflection on the substrate of incident light through the gap between adjacent mirrors. The contrast of an image display generated by adjacent mirrors is degraded due to the reflections generated not by the mirrors but by the gaps between the mirrors. As a result, a quality of the image display is worsened. In order to overcome such problems, the mirrors are arranged on a semiconductor wafer substrate with a layout to minimize the gaps between the mirrors. One mirror device is generally designed to include an appropriate number of mirror elements wherein each mirror element is manufactured as a deflectable mirror on the substrate for displaying a pixel of an image. The appropriate number of elements for displaying image is in compliance with the display resolution standard according to a VESA Standard defined by Video Electronics Standards Association or television broadcast standards. In the case in which the mirror device has a plurality of mirror elements corresponding to WXGA (resolution: 1280 by 768) defined by VESA, the pitch between the mirrors of the mirror device is 10 μm and the diagonal length of the mirror array is about 0.6 inches.

The control circuit as illustrated in FIG. 1C controls the mirrors to switch between two states and the control circuit drives the mirror to oscillate to either the ON or OFF deflected angle (or position) as shown in FIG. 1A.

The minimum quantity of light controllable to reflect from each mirror element for image display, i.e., the resolution of gray scale of image display for a digitally controlled image Projection apparatus, is determined by the least length of time that the mirror is controllable to hold at the ON position. The length of time that each mirror is controlled to hold at an ON position is in turn controlled by multiple bit words. FIG. 1D shows the "binary time periods" in the case of controlling an SLM by four-bit words. As shown in FIG. 1D, the time periods have relative values of 1, 2, 4, and 8 that in turn determine the relative quantity of light of each of the four bits, where the "1" is least significant bit (LSB) and the "8" is the most significant bit. According to the PWM control mechanism, the minimum quantity of light that determines the resolution of the gray scale is a brightness controlled by using the "least significant bit" for holding the mirror at an ON position during a shortest controllable length of time.

In a simple example with n-bit word for controlling the gray scale, one frame time is divided into $(2^n-1)$ equal time slices. If one frame time is 16.7 msec., each time slice is $16.7/(2^n-1)$ msec.

Having set these time lengths for each pixel in each frame of the image, the quantity of light in a pixel which is quantified as "0" time slices is black (i.e., no quantity of light), "1" time slice is the quantity of light represented by the LSB, and 15 time slices (in the case of n=4) is the quantity of light represented by the maximum brightness. Based on the light being quantified, the time of mirror being held at the ON position during one frame period is determined by each pixel. Thus, each pixel with a quantified value which is more than "0" time slice is displayed for the screen by the mirror being held at the ON position with the number of time slices corresponding to its quantity of light during one frame period. The viewer's eye integrates the brightness of each pixel in such a manner that the image is displayed as if the image were generated with analog levels of light.

For controlling deflectable mirror devices, the PWM calls for the data to be formatted into "bit-planes", where each bit-plane corresponds to a bit weight of the quantity of light. Thus, when the brightness of each pixel is represented by an n-bit value, each frame of data has the n-bit planes. Then, each bit-plane has a "0" or "1" value for each mirror element. In the PWM described in the preceding paragraphs, each bit-plane is independently loaded and the mirror elements are controlled on the basis of bit-plane values corresponding to them during one frame. For example, the bit-plane representing the LSB of each pixel is displayed as a "1" time slice.

When adjacent image pixels are displayed with a very coarse gray scales caused by great differences of quantity of light, thus, artifacts are shown between these adjacent image pixels. That leads to the degradations of image qualities.

The degradations of image qualities are specially pronounced in bright areas of image when there are "bigger gaps" of gray scale, i.e. quantity of light, between adjacent image pixels. The artifacts are caused by a technical limitation that the digitally controlled image does not obtain a sufficient number of gray scales, i.e. the levels of the quantity of light.

The mirrors are controlled either at the ON or OFF position. Then, the quantity of light of a displayed image is determined by the length of time each mirror is held, which is at the ON position. In order to increase the number of levels of the quantity of light, the switching speed of the ON and OFF positions for the mirror must be increased. Therefore the digitally control signals need be increased to a higher number of bits. However, when the switching speed of the mirror deflection is increased, a stronger hinge for supporting the mirror is necessary to sustain a required number of switches of the ON and OFF positions for the mirror deflection. Furthermore, in order to drive the mirrors provided with a strengthened hinge to the ON or OFF positions, applying a higher voltage to the electrode is required. The higher voltage may exceed twenty volts and may even be as high as thirty volts. The mirrors produced by applying the CMOS technologies probably is not appropriate for operating the mirror at such a high range of voltages, and therefore the DMOS mirror devices may be required. In. order to achieve a control of a higher number of gray scales, a more complicated production process and larger device areas are required to produce the DMOS mirror. Conventional mirror controls are therefore faced with a technical problem that the good accuracy of gray scales and range of the operable voltage have to be sacrificed for the benefits of a smaller image Projection apparatus.

There are many patents related to the control of quantity of light. These Patents include the U.S. Pat. Nos. 5,589,852, 6,232,963, 6,592,227, 6,648,476, and 6,819,064. There are further patents and patent applications related to different sorts of light sources. These Patents include the U.S. Pat. Nos. 5,442,414, 6,036,318 and Application 20030147052. Also, The U.S. Pat. No. 6,746,123 has disclosed particular polarized light sources for preventing the loss of light. However, these patents or patent applications do not provide an effective solution to attain a sufficient number of gray scales in the digitally controlled image display system.

Furthermore, there are many patents related to a spatial light modulation that includes the U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions do not provide a direct solution for a person skilled in the art to overcome the above-discussed limitations and difficulties.

In view of the above problems, an invention has disclosed a method for controlling the deflection angle of the mirror to express higher number of gray scales of an image in a U.S. Patent Application 20050190429. In this disclosure, the quantity of light obtained during the oscillation period of the mirror is about 25% to 37% of the quantity of light obtained during the mirror is held on the ON position at all times.

According to such control, it is not particularly necessary to drive the mirror at high speed. Also, it is possible to provide a higher number of gray scales using a low elastic constant of the hinge that supports the mirror. Hence, such control makes it possible to reduce the voltage applied to the address electrode.

An image projection apparatus using the mirror device described above is broadly categorized into two types, i.e. a single-plate image Projection apparatus provided with only one spatial light modulator and a multi-plate image Projection apparatus provided with a plurality of spatial light modulators. In the single-plate image Projection apparatus, a color image is displayed by changing in turn the colors, i.e. frequency or wavelength of projected light is changed by time. In a multi-plate image Projection apparatus, a color image displayed by allowing the spatial light modulators corresponding to beams of light having different colors, i.e. frequencies or wavelengths of the light, to modulate the beams of light; and combined with the modulated beams of light at all times.

In these days, high resolutions such as a full high-definition (Full HD: 1920 by 1080 pixels) are required on field of a projection apparatus, prompting the design and development of a higher resolution display.

A mirror device used in such a projection apparatus is constituted by a mirror array arraying one to two million mirror elements in two-dimensional array.

The size of a mirror of the mirror element of a common mirror device is a square of 11 μm. The wiring process rule of a CMOS circuit unit of a memory cell for driving the mirror is configured to be 0.25 μm. The mirror is controlled by setting the operating voltage of the memory cell or mirror drive voltage, which is set to five volts. Such a mirror is supported by an elastic hinge.

A common mirror device used for a Full-HD is the diagonal size of 24.13 mm (0.95 inches), with the mirror pitch of 11 μm. An XGA-size mirror device has the diagonal size of 17.78 mm (0.7 inches) of the mirror array, with the mirror pitch of 14 μm.

FIG. 2 is a diagonal view of a mirror device arraying, in two-dimension on a device substrate, mirror elements controlling a reflection direction of incident light by deflecting the mirror.

The mirror device 200 shown in FIG. 2 is constituted by arraying a plurality of mirror elements, each mirror element 300 is constituted by address electrode (not shown in a drawing herein), elastic hinge (not shown in a drawing herein) and a mirror supported by the elastic hinge, lengthwise and crosswise (in two-dimension) on a device substrate 303. FIG. 2 illustrates a case of arraying a plurality of mirror elements respectively comprising square mirrors 302 lengthwise and crosswise at a constant interval on the device substrate 303.

The mirror 302 of one mirror element 300 is controlled by applying a voltage to the address electrode provided on the device substrate 303. Note that the present specification document calls the distance between the deflection axes of adjacent mirrors 302 as pitch and the distance between the respective sides of the present mirror and adjacent mirror 302 as gap.

A deflection axis 201 for deflecting the mirror 302 is indicated by the dotted line. The light emitted from a light source 301 is incident to the mirror 302 so as to be orthogonal or diagonal to the deflection axis 201.

The following is a description on an operation of one mirror element 300 by referring to the cross-sectional line II-II of the one mirror element 300 of the mirror device 200 shown in FIG. 2.

FIGS. 3A and 3B are cross-sectional diagrams of one mirror element in the line II-II of the mirror device shown in FIG. 2.

The one mirror element 300 comprises a mirror 302, an elastic hinge 304 supporting the mirror 302, address electrodes 307a and 307b, and two memory cells including a first memory cell and a second memory cell both for applying a voltage to the address electrodes 307a and 307b in order to control the mirror 302 under a desired deflection state. The drive circuits for the respective memory cells are provided in the inside of the device substrate 303 so that a control of each memory cell based on the signal of image data makes it possible to control the deflection angle of the mirror 302, and modulate and reflect the incident light.

FIG. 3A is a cross-sectional diagram of a mirror element reflecting incident light to a projection optical system by deflecting the mirror.

An application of a signal (0, 1) to a memory cell applies a voltage of "0" volt to the address electrode 307a and that of Va volts to the address electrode 307b, both shown in FIG. 3A. As a result, the mirror 302 is drawn by a coulomb force and deflected from the horizontal state to the direction of the address electrode 307b to which a voltage of Va volts is applied. This results in reflecting the incident light on the mirror 302 to the projection optical system (which is referred to as an ON light state). Note that an insulation layer 306 is applied onto the device electrode 303, and a hinge electrode 305 connected to the elastic hinge 304 is grounded through a via (not shown in a drawing herein) provided in the insulation layer 306

FIG. 3B is a cross-sectional diagram of a mirror element not reflecting the incident light to the projection optical system by deflecting the mirror.

An application of a signal (1, 0) to a memory cell applies a voltage of Va volts to the address electrode 307a and that of "0" volt to the address electrode 307b. As a result, the mirror 302 is drawn by a coulomb force and deflected from the horizontal state to the direction of the address electrode 307a to which a voltage of Va volts is applied. This results in reflecting the incident light to the outside of the projection optical system (which is referred to as an OFF light state).

Incidentally, the Coulomb force generated between the mirror 302 and address electrode 307a, or 307b, is expressed by the following expression:

$$F = k'e\, SV^2/2h^2 \qquad (1);$$

Where S is the area size of the address electrode 307a or 307b, h is the distance between the mirror 302 and address electrode 307a or 307b, e is the permittivity between the mirror 302 and address electrode 307a or 307b, V is the voltage applied to the address electrode 307a or 307b, and k' is a correction coefficient.

FIG. 4 is a cross-sectional diagram exemplifying a situation of operating each mirror element provided on the device substrate shown in FIG. 2.

An independent operation of the each mirror element 300 in the ON light state or OFF light state as shown in FIGS. 3A and 3B controls the direction of reflection of the incident light. Here, the incident light to the side edges of the mirror 302 is diffused to directions other than the desired direction when the light is reflected. And the incident light going through the gap between the adjacent mirrors 302 is reflected on the device substrate 303, thus generating an extraneous reflection light.

Meanwhile, in the mirror 302 illuminated by the incident light, a diffraction light is generated in a direction orthogonal to each side of the mirror 302. If these components of diffusion light and extraneous diffraction light enter the eye of the projection lens of the projection apparatus, the contrast of an image is degraded.

FIG. 5 exemplifies a simplified projection apparatus comprising a mirror device.

The projection apparatus shown in FIG. 5 comprises a light source 301, an illumination optical system 308, a mirror device 200, a projection lens 309 and a light shield member 311.

In the projection apparatus, the light emitted from the light source 301 is converged by the illumination optical system 308 and incident to the mirror array of the mirror device 200 at which the deflection of the mirror of each mirror element is controlled by an image signal based on the incident light. The reflection light modulated and reflected on the individual mirror element 300 oriented in the ON light state enters the projection lens 309 to be projected onto a screen 310. On the other hand, the reflection light reflected on the individual mirror element 300 oriented in the OFF light state is shielded by the light shield member 311 to be not projected onto the screen 310.

FIG. 6A illustrates the eye and range of light flux of a projection lens and the intensity of light when a mirror element is oriented in an ON light state in the projection apparatus shown in FIG. 5.

As described for FIG. 5, when the mirror 302 is oriented in the ON light state, the illumination light emitted from the light source 301 is reflected toward the projection lens 309 so that the reflection light $312_{ON}$ enters the projection lens 309 in a manner to cover the eye thereof. Then, the reflection light $312_{ON}$ is converged by the projection lens 309 and projected onto the individual pixel corresponding to each mirror element 300 of the screen 310. In this event, the intensity of the reflection light $312_{ON}$ is the maximum at the center of the eye of the projection lens 309. And the intensity of the reflection light $312_{ON}$ is decreased with the distance from the center of the eye of the projection lens 309.

FIG. 6B illustrates the eye and range of light flux of a projection lens and the intensity of light when a mirror element is oriented in an OFF light state in the projection apparatus shown in FIG. 5.

As described for FIG. 5, when the mirror 302 is oriented in the OFF light state, the illumination light emitted from the light source 301 is reflected so that the reflection light $312_{OFF}$ does not enter the projection lens 309 and therefore the reflection light $312_{OFF}$ does not enter the eye of the projection lens 309. And the reflection light $312_{OFF}$ is shielded by the light shield member 311.

A few characteristic mirrors are disclosed as the mirrors 302 of such mirror elements 300.

One example is a U.S. Pat. No. 6,128,121 disclosing a mirror comprising an opening part at the center of the support layer of the mirror, on which a reflection member is layered.

Such a mirror 302, however, comprising the opening part at the center of the support layer, allows a small step nearby the opening part of the layered reflection member. This step allows a generation of an extraneous diffraction light from the center of the mirror 302. And the diffraction light entering the projection lens 309 causes the problem of degrading the contrast of an image.

FIG. 7 illustrates a mirror comprising an opening part at the center of the support layer of the mirror, with a reflection member being layered on the opening part. Note that this is delineated by emphasizing a step 702 of the reflection member at the center.

An illumination, on the step 702 nearby the opening part of the mirror 302, of the light 701 emitted from the light source 301 generates diffraction light 703 in a direction orthogonal to a side orthogonal to a direction of light illuminated on the step 702 of the opening. And the incidence of the diffraction light 703 to the projection lens degrades the contrast of an image. Therefore, the mirror must be designed by considering- such an influence of the diffraction light 703.

Next, in order to respond to a high-resolution projection apparatus, the number of mirror elements must also be increased, requiring a miniaturization of a mirror size of the mirror element. An increase of the number of mirror elements without miniaturizing the mirror size enlarges the size of the mirror array proportionately with the number of mirror elements. And brought about is a problem of an enlarged mirror device enlarging the entirety of the optical system of the projection apparatus, resulting in enlarging the projection apparatus per se. Therefore, an important challenge for solving the problem of enlarged projection apparatus associated with the high resolution projection apparatus is a response to the miniaturization of the mirror size of a mirror element.

Also required for miniaturizing the mirror size is a miniaturization of the memory cell and structure body residing under the mirror. For miniaturizing the memory cell, the wiring process rule for a MOS circuit of the memory cell also needs to be miniaturized. Once the wiring process rule is miniaturized, the operating voltage of an FET transistor or such is decreased, and a voltage applicable to an individual address electrode for controlling the deflection of a mirror is decreased. If the deflection of a mirror is controlled in such a configuration without improving an elastic hinge, a voltage to be applied to the address electrode needs to be increased in order to control the deflection of the mirror. Consequently ushered in is a problem such as a circuit formed in the device substrate (e.g., the withstand voltage of a transistor, the capacitance of a DRAM capacitor, et cetera) needing to be increased for increasing the voltage to be applied to the address electrode. In order to solve such a problem, the elastic hinge also needs to be miniaturized. The elastic hinge, however, is very thin and small as compared to the mirror, requiring a consideration for the endurance against a repetition of usages as well as considerations for the method of supporting the mirror and for the endurance against usage environments and temperature changes in order to achieve a miniaturization of the elastic hinge, thus a difficulty accompanies the miniaturization of the elastic hinge.

Meanwhile, an enforcement of a restitution force of the elastic hinge makes it possible to speed up the deflecting operation of the mirror. A speedier deflection control enables a minute adjustment of a light intensity and an obtainment of a higher level-gray scale of an image. A reinforcement of the elastic hinge for an improved restitution force thereof, however, requires an increased voltage to be applied to the address electrode, requiring a larger area size thereof. In terms of this point, the elastic hinge is conventionally placed at the center of a mirror, thus limiting the design of a mirror element, such as the form and area size of the address electrode, and therefore a hurdle exists in enlarging the area size of the address electrode as well.

The following lists reference patent documents as the related conventional techniques.

United States Patent Application Publication No. 20060023286:

This document has disclosed a mirror device connecting vertical hinges on both end of a mirror.

United States Patent Application Publication No. 6128121:

This document has disclosed a mirror device supporting a mirror comprising an opening part with two vertical hinges.

United States Patent Application Publication No. 6735008:

This document has disclosed a vertical hinge connected to the center part of a mirror.

United States Patent Application Publication No. 5061049:

This document has disclosed a mirror device supporting a mirror with a torsion hinge.

United States Patent Application Publication No. 6552840:

This document has disclosed a mirror device constituted by a mirror element comprising a stepwise electrode.

Therefore, according to above discussions, a need still exists for those of ordinary skill in the art to further provide new and improved systems and methods to further improve the image display systems such that the above discussed difficulties and limitations can be resolved.

SUMMARY OF THE INVENTION

A first aspect of the present invention is to provide a mirror device comprising plural mirror elements, each of which comprises a mirror for reflecting illumination light emitted from a light source, a hinge for supporting the mirror placed on a substrate, a hinge structure body for supporting the hinge, and electrodes for controlling a deflection direction of the mirror placed on the substrate, and in each of which the hinge is placed so as to traverse the edge of the mirror or the border with an adjacent mirror.

A second aspect of the present invention is to provide a mirror device comprising plural mirror elements, each of which comprises a mirror for reflecting illumination light emitted from a light source, plural hinges, each of which is for supporting the mirror placed on a substrate, electrodes for controlling a deflection direction of the mirror placed on the substrate, stoppers for keeping a deflection angle of the mirror placed on the substrate, and in each of which the hinge is placed so as to traverse the edge of the mirror or the border with an adjacent mirror and the stopper is shared with an adjacent mirror.

A third aspect of the present invention is to provide a mirror device comprising plural mirror elements, each of which comprises a mirror for reflecting illumination light emitted from a light source, a hinge in which a support layer for supporting the mirror placed on a substrate is formed, electrodes for controlling a deflection direction of the mirror placed on the substrate, and in each of which at least one side of the support layer is oriented in a direction practically parallel with an incident direction of the illumination light emitted from the light source.

A fourth aspect of the present invention is to provide a mirror device comprising plural mirror elements, each of which comprises a practically square mirror for reflecting illumination light emitted from a light source, a hinge for supporting the mirror placed on a substrate, and electrodes for controlling a deflection direction of the mirror placed on the substrate, and in each of which the hinge is placed so as to traverse the edge of the mirror or the border with an adjacent mirror and the length of one side of the mirror is between 4 μm and 10 μm.

A fifth aspect of the present invention is to provide a mirror device comprising plural mirror elements, each of which comprises a mirror for reflecting illumination light emitted from a light source, a hinge for supporting the mirror placed on a substrate, a hinge structure body for supporting the hinge, and plural electrodes of practically the same form for controlling a deflection direction of the mirror placed on the substrate, and in each of which the plural electrodes are placed practically point-symmetrical with respect to the center of the mirror.

A sixth aspect of the present invention is to provide a projection apparatus comprising: a mirror device, according to the first aspect, for modulating and reflecting light emitted from a light source; and a projection optical system for projecting the light reflected by the mirror device.

A seventh aspect of the present invention is to provide a projection apparatus comprising: a mirror device, according to the second aspect, for modulating and reflecting light emitted from a light source; and a projection optical system for projecting the light reflected by the mirror device.

An eighth aspect of the present invention is to provide a projection apparatus comprising: a mirror device, according to the third aspect, for modulating and reflecting light emitted from a light source; and a projection optical system for projecting the light reflected by the mirror device.

A ninth aspect of the present invention is to provide a projection apparatus comprising: a mirror device, according to the fourth aspect, for modulating and reflecting light emitted from a light source; and a projection optical system for projecting the light reflected by the mirror device.

A tenth aspect of the present invention is to provide a projection apparatus comprising: a mirror device, according to the fifth aspect, for modulating and reflecting light emitted from a light source; and a projection optical system for projecting the light reflected by the mirror device.

These and other objects and advantages of the present invention will no doubt become obvious to those of ordinary skills in the art after reading the following detailed description of the preferred embodiment, which is illustrated in the various drawing figures.

BRIEF DESCRIPTION OF THE DRAWINGS

FIG. 12A is a cross-sectional diagram of the mirror element shown in FIG. 11 delineating the situation of repeating a reflection, and no reflection, of incident light to a projection light path by freely oscillating a mirror;

FIG. 12B illustrates the eye, and the range of light flux, of a projection lens and an intensity of light when the mirror element according to the present embodiment is operated in a free oscillation state at the projection apparatus shown in FIG. 5;

FIG. 14C is a side view diagram of a configuration of a two-plate projection apparatus comprising the two mirror devices described above;

FIG. 14D is an upper plain view diagram of a configuration of a two-plate projection apparatus comprising two mirror devices according to the present embodiment.

DESCRIPTION OF THE PREFERRED EMBODIMENTS

Reference is now made to the above listed Figures for the purpose of describing, in detail, the preferred embodiments of the present invention. The Figures referred to and the accompanying descriptions are provided only as examples of the invention and are not intended in anyway to limit the scope of the claims appended to the detailed description of the embodiment.

A mirror device includes a plurality of mirror elements, each of which comprises a mirror for reflecting illumination light emitted from a light source, a hinge for supporting the mirror placed on a substrate, a hinge structure body for supporting the hinge, and electrodes for controlling a deflection direction of the mirror placed on the substrate, and in each of which the hinge is placed so as to traverse the edge of the mirror or the border with an adjacent mirror.

The following is a description on the structure and operation of a mirror element of a mirror device according to the present preferred embodiments by referring to the accompanying drawings.

Embodiment 1

Figure 8:
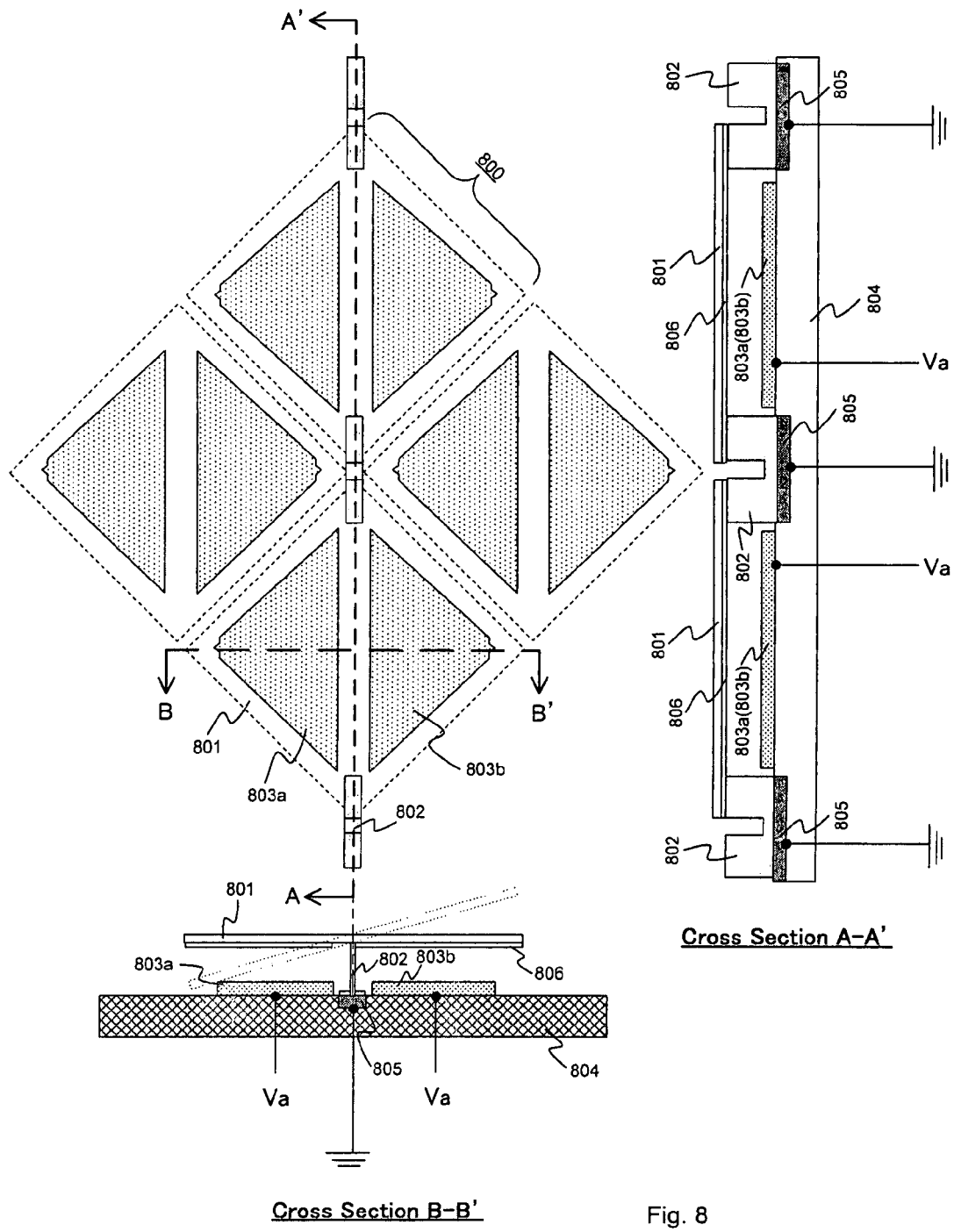
FIG. 8 is a plain view diagram, and a cross-sectional diagram, of a mirror element of a mirror device according to a preferred embodiment 1.

FIG. 8 shows a top view and cross-sectional view of a mirror element implemented in a mirror device according to a preferred embodiment 1.

The top left drawing of FIG. 8 shows a top view of four mirror elements 800 of a mirror device according to the embodiment 1.

The first is a description of the configuration of each mirror element 800 shown in FIG. 8.

The mirror 801 of each mirror element 800 shown in FIG. 8 is formed as an approximate square such as a square or a parallelogram. The length of each of four sides of the mirror 801 is preferably between approximately 4 to 10 μm.

Application of a voltage to address electrodes 803a and 803b generates a coulomb force to draw the mirror 801 and deflects the mirror to incline to a deflection angle relative to a deflection axis. This mirror deflection causes a change of directions in reflecting the light illuminated on the mirror 801. FIG. 8 indicates the mirror 801 of each mirror element by a dotted line. And there is a layer referred to as a support layer 806 under the mirror 801 and the layer is connected to an elastic hinge 802. The support layer 806 may alternatively be placed only in the connection part with the elastic hinge 802 in place of the entire surface under the mirror 801. Also, a connection member made from Ti, W, Ta or connection members made with similar materials may alternatively be provided between the elastic hinge 802 and support layer 806. The material of the mirror is preferably made of aluminum to function as a reflection member.

The elastic hinge 802 is shared between an edge part of a mirror 801 and that of a mirror adjacent to the present mirror 801, and connected to the support layers 806 of both mirrors 801. The elastic hinge 802 shown in the configuration of FIG. 8 is provided in the proximity of the deflection axes of the respective mirrors 801 and the deflection axes of the mirrors share the hinge 802 are in the same direction. The elastic hinge 802 is featured with a groove as a gap to separate the upper parts of the hinge each supporting an individual mirrors 801. Such a configuration prevents an extraneous force from applying to the part of the hinge separate by the gap when one part of the hinge 802 is deflected. The gap thus practically eliminates an influence from the deflection of another mirror 801 to apply to a mirror sharing the elastic hinge 802. Therefore, it is possible to control the individual mirrors 801 independently even if they share the elastic hinge 802. It is preferable to form the elastic hinge 802 at a position to maximize and equalize the area sizes of the address electrodes 803a and 803b on the left and right sides of the deflection axis of the mirror 801.

The material of the elastic hinge 802 is preferably an elastomer that may include compositions materials of silicon (Si), such as amorphous silicon (a-Si) and single crystal silicon, and may further be configured as a conductive hinge by doping with arsenic or phosphorus. Similar materials are also preferred to form the support layer 806.

Furthermore, the elastic hinge 802 is also provided with a hinge electrode 805 disposed under the hinge and near the corners of two adjacent mirrors, the hinge electrode is formed as part of the hinge structure and is connected to a ground voltage. Alternately, the hinge structural body for supporting the elastic hinge 802 may also be provided separately from the hinge electrode 805.

The address electrodes 803a and 803b are placed under the mirror 801. Applying a voltage to the address electrodes 803a and 803b generates a coulomb force between the mirror 801 and address electrode 803a, or 803b to deflect the mirror 801 in a desired direction. Conventionally, an elastic hinge 802 is formed nearby the center part of a mirror 801, requiring a placement of the address electrodes 803a and 803b in the locations to avoid the elastic hinge 802. Therefore the shape and locations for placement of the address electrodes 803a and 803b have been limited. Whereas the present embodiment 1 is configured to connect the elastic hinge 802 so as to share the end part of the mirror 801 and that of the adjacent mirror 801, the areas on the substrate under center part of the mirror 801 are available. The address electrodes 803a and 803b may be flexibly placed near the areas under the center part of the mirror. The freedom of mirror design of the mirror element 800 and the address electrode are expanded to the configuration also increases the size of the address electrodes 803a and 803b and therefore increase the Coulomb force for deflecting the mirror 801. A voltage applied to the address electrodes 803a and 803b for deflecting the mirror 801 may be decreased. The mirror 801 may be controlled with a low voltage while keeping the Coulomb force at the same level. A DRAM circuit as control circuit for the mirror 801 can be implemented thus reduces the size of the image control device and makes the display system more compact. Moreover, it is possible to control the mirror 801 by a low volt, thus reducing the power consumption for controlling the mirror device.

Incidentally, the configuration shown in FIG. 8 is such that the address electrodes 803a and 803b are placed on the left and right sides under the mirror 801 and are formed practically as a triangle to maintain the electrodes to have the area.

The top right drawing of FIG. 8 is a diagram of a side view of the cross-section of the line A-A' indicated in the plain view diagram of the mirror element shown in the top left drawing of FIG. 8.

The support layer 806 connected to the elastic hinge 802 supports the mirror 801. The support layer 806 is shared between adjacent mirrors 801. The elastic hinge 802 is attached to the areas around the edges of the support layer 806 that support at least two adjacent mirrors. The elastic hinge 802 includes a groove in line with the gap between the adjacent mirrors 801. The elastic hinge 802 is connected to the hinge electrode 805 shared between at least two adjacent mirrors. The address electrodes 803a and 803b are placed on the substrate 804 under the mirror 801. The address electrodes 803a and 803b are connected to a controller (not shown) for applying a voltage Va to selectively activate each of these mirrors.

The bottom left drawing of FIG. 8 is a side view diagram of the cross-section of the line B-B' of the plain view diagram of the mirror element shown on the top left side of FIG. 8.

Applying a voltage Va to the address electrode 803a deflects the mirror 801 to the left side as a coulomb force generated between the address electrode 803a and mirror 801 draws the mirror on the left side. And the mirror come into contact with the address electrode 803a, on the left, layered with an insulation film, thereby the deflection of the mirror 801 being maintained at a constant angle.

An illumination of the incident light in the state of maintaining the deflection angle of the mirror makes the illumination light reflected to a constant direction.

In summary, the present embodiment is configured with the elastic hinge 802 attached to the mirror on the edges or the corner of the mirror 801. There are larger areas available under the center parts of the mirror for placement of the address electrodes 803a and 803b. The electrodes can be formed with larger size to obtain a larger coulomb force between the mirror 801 and address electrode 803a or 803b. A larger coulomb force enables reinforcement (e.g., a larger thickness) of the structure of the elastic hinge 802, more stable support is therefore achieved for the mirror 801 more. Furthermore, a larger coulomb force enables a quicker control of deflecting the mirror 801 and an improvement of the gradation of an image.

Embodiment 2

Figure 9A:
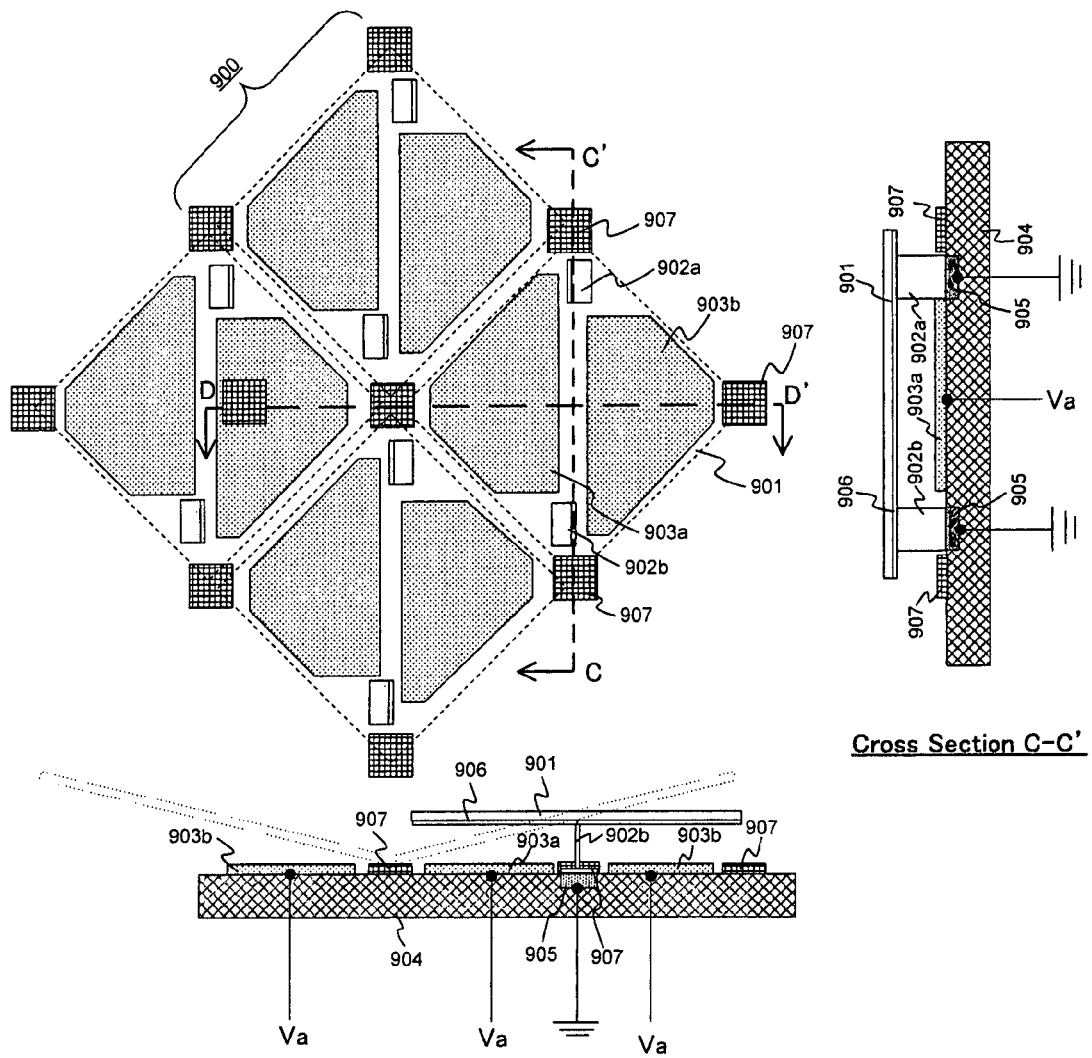
FIG. 9A is a plain view, and a cross-sectional diagram, of a mirror element of a mirror device according to a preferred embodiment 2.

FIG. 9A shows a top view and two cross-sectional views of a mirror element implemented in a mirror device according to a preferred embodiment 2.

The top left drawing of FIG. 9A is a top view of four mirror elements of a mirror device according to the embodiment 2.

FIG. 9A illustrates a mirror 901 that is deflected relative to the deflection axis by a coulomb force generated by applying a voltage to address electrode 903a or 903b. The deflected mirror 901 changes the reflecting direction of the light illuminated on the mirror 901. Under each of the mirrors 901 there is a layer referred to as the support layer 906 connected to two elastic hinges 902a and 902b to support at least two adjacent mirrors by attaching to the corners of these adjacent. The support layer 906 may alternatively be formed integrally with the elastic hinges 902a and 902b.

These elastic hinges 902a and 902b are support the mirrors and function as the deflection axis of the mirror 901. FIG. 9A shows the elastic hinge 902a attached to bottom surface on the right corner of the mirror 901. The elastic hinge 902b is attached to the bottom surface on the left corner of the mirror 901 for equalizing the area of the address electrodes 903a and 903b positioned on the left and right sides of the mirror 901. These elastic hinges 902a and 902b are preferably placed to maximize and equalize the area sizes of the address electrodes 903a and 903b on the left and right sides of the mirror 901.

With the elastic hinges 902a and 902b disposed separately in two places near the corners of the mirror 901 as described above, the hinge supports the mirror 901 stably against a rotation of the mirror surface in the horizontal direction. Furthermore, connecting two elastic hinges 902a and 902b to the same support layer 906 supports the mirror 901 stably, withstanding an external vibration.

The hinge electrodes 904 and 905 are disposed respectively under the two elastic hinges 902a and 902b. The hinge electrode is formed an integral part of the hinge structural bodies for supporting the respective elastic hinges 902a and 902b. The individual hinge electrodes 905 are grounded. Note that the hinge structural bodies may alternatively be provided separately from the hinge electrodes 905.

The address electrodes 903a and 903b are placed under the mirror 901. By a voltage to the address electrode 903a or 903b generates a coulomb force between the mirror 901 and address electrode 903a or 903b, making it possible to deflect the mirror 901. The elastic hinge has conventionally been formed nearby the center part of a mirror, limiting the form, placement or such of address electrodes positioned under the mirror. Whereas the present embodiment 2 is also configured to equip the elastic hinges 902a and 902b at both of the corner or edges of the mirror, thereby allowing a free usage of the vicinity of the center part under the mirror 901. This accordingly makes it possible to place the address electrodes 903a and 903b, and such, freely in the vicinity of the center part under the mirror 901. Also enabled is an increase of the area size of the address electrodes 903a and 903b and, therefore, an increase of the Coulomb force for deflecting the mirror 901. As a result, a voltage to be applied to the address electrodes 903a and 903b for deflecting the mirror 901 can be decreased. And the capability of decreasing the voltage to be applied to the address electrodes 903a and 903b makes it possible to make the mirror 901 more compact, as described for the embodiment 1.

Note that the configuration of FIG. 9A shows the form of the address electrodes 903a and 903b positioned on the left and right sides of the deflection axis of the mirror 901 under the mirror and featured as one edge of the approximate triangle being cut off substantially, and equalizes the area size of the address electrodes 903a and 903b by placing them symmetrically about a point of the center of the mirror 901.

Stoppers 907 are placed in the locations for shared by the apexes of the individual mirrors 901. When the mirror 901 is deflected by applying a voltage to the address electrodes 903a and 903b to generate a coulomb force, the mirror 901 comes into contact with a stopper 907 thus maintaining a constant deflection angle, thus determining the reflection of the light at a prescribed direction. An appropriate adjustment of the height or such of the stopper 907 makes it possible to determine the deflection angle of the mirror 901. A sharing of the stopper 907 with the respective mirrors 901 makes it possible to reduce the number of the stoppers when compared to a conventional configuration. The reduced number of stoppers is implemented also to control the reflection light at practically the same deflection angle as that of the adjacent mirrors 901.

Compared with the structure of integrating a stopper with the address electrodes 903a and 903b, this structure provide another advantage that the stiction of the mirror to the address electrodes is prevented that often occur sat the time when the mirror comes into contact with the address electrode 903a or 903b.

The top left drawing of FIG. 9A is a view, from the right side, of the cross-section on the line C-C' indicated in the plain view diagram of the mirror element shown on the top left side of FIG. 9A.

The mirror 901 is supported by the support layer 906, on both ends part of which is connected to the two elastic hinges 902a and 902b. The elastic hinges 902a and 902b are connected to the respective hinge electrodes 905 corresponding to the individual elastic hinges 902a and 902b within the substrate 904. The address electrodes 903a and 903b are placed on the substrate 904 positioned under the mirror 901, and the address electrode 903a on the left side of the mirror 901 is placed in symmetry about a point of the center of the mirror 901 and against the address electrode 903b on the right side of the mirror 901. And the individual address electrodes 903a and 903b are provided with means for applying the voltage Va from a control circuit (not shown in a drawing herein).

The bottom left drawing of FIG. 9A is a side view of the cross-section on the line D-D' indicated in the plain view diagram of the mirror element shown on the top left side of FIG. 9A.

When a voltage is applied to the address electrode 903a on the left side, the mirror 901 of the mirror element 900 is deflected to the left side by a Coulomb force acting between the address electrode 903a on the left side and mirror 901. Then, the mirror 901 comes into contact with the stopper 907 shared with the adjacent mirror 901 thus maintaining a constant deflection angle. An illumination of the incident light in the state of determining the deflection of the mirror 901 reflects the illumination light in a prescribed direction.

The description below explains by an example of a support layer 906 of the mirror element 900 shown on the top left of FIG. 9A by referring to FIG. 9B.

Figure 9B:
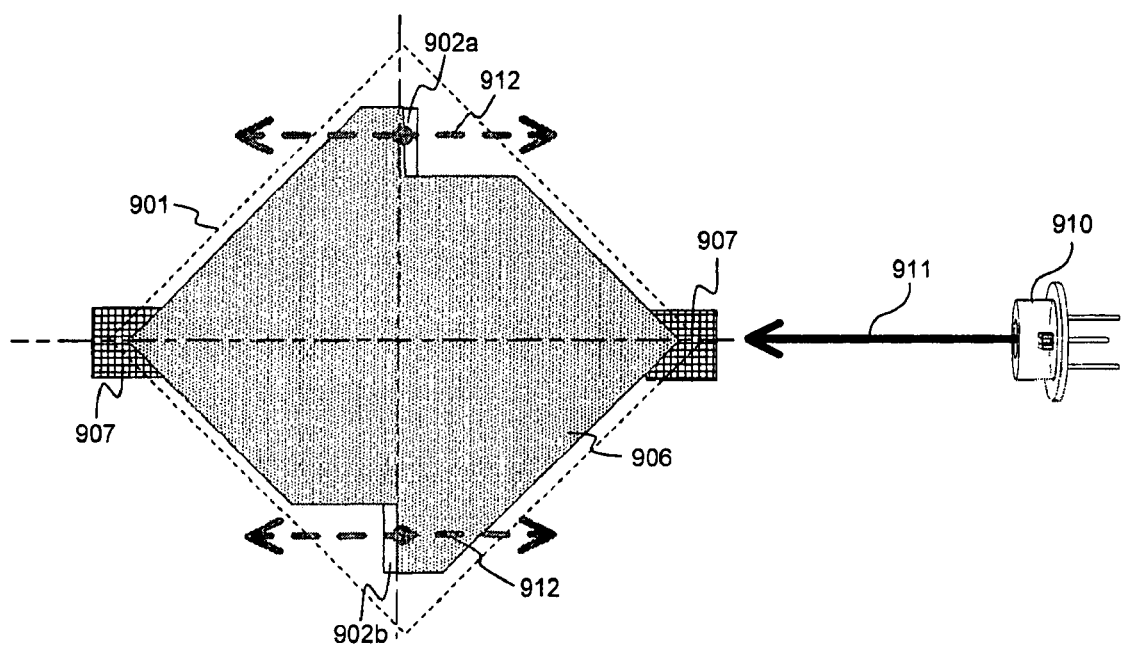
FIG. 9B exemplifies a support layer of a mirror of a mirror element shown on the top left side of FIG. 9A.

FIG. 9B shows a support layer 906 of the mirror of the mirror element 900 shown on the top left side of FIG. 9A.

The mirror 901 of FIG. 9A is placed on the support layer 906 shown in FIG. 9B. The support layer 906 is shaped with cutout parts at the respective connection parts with the elastic hinges 902a and 902b. In the production process of the mirror, a sacrifice layer is layered uniformly so as to cover on each support layer 906 and support layer be exposed by polishing the deposited sacrifice layer, followed by forming a layer to function as the mirror 901. Since the thickness of the mirror 901 is merely a level of 1000 to 3000 angstroms, however, a slight step in response to the shapes of the surface for forming layer for the mirror 901 is generated in the production process. This results in leaving a slight step on the surface of the mirror 901 layered on the support layer 906 in the cutout part.

Meanwhile, FIG. 9B illustrates the diffraction light generated at the time of illuminating the mirror with the incident light from the orthogonal direction to the deflection axis of the mirror.

The diffraction light 912 is generated in the orthogonal direction to each side of the mirror 901 illuminated with the light. Therefore the diffraction light 912 is generated in the direction of the left and right arrows shown in FIG. 9B from both of the edges of the mirror 901, to which the illumination light is incident, on the mirror placed on the support layer 906 of FIG. 9B. In this case, the diffraction light 912 is generated only at both of the sides of the mirror 901 and therefore it is possible to reduce the influence of the diffraction light entering into the projection lens when compared to the mirror shown for the conventional technique which has a step in the center part of the mirror, generating the diffraction light at the center part.

Figure 10:
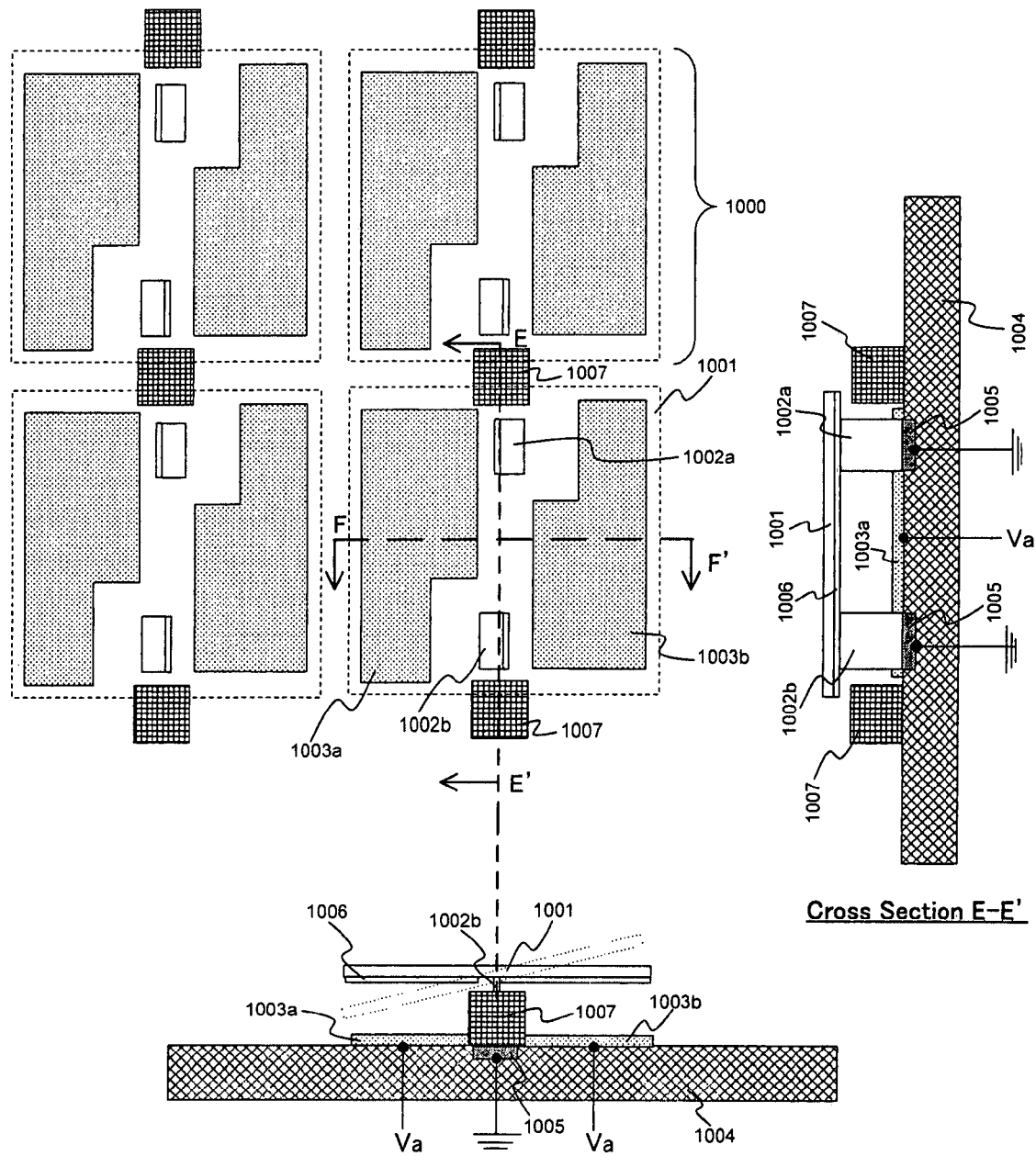
FIG. 10 is a plain view diagram, and a cross-sectional diagram, of a modified example of the mirror element shown in FIG. 9A.

FIG. 10 shows a modified embodiment 2 of the mirror device.

FIG. 10 show a top view and two cross-sectional views of a modified example of the mirror element shown in FIG. 9A.

The top left drawing of FIG. 10 is the top view diagram of a modified example of the four mirror elements shown in FIG. 9A.

The mirror element 1000 of FIG. 10 comprises a center division line of the mirror 1001 as the deflection axis thereof, which is different from the mirror element 900 of FIG. 9A. It also includes elastic hinges 1002a and 1002b at positions of the respective both edges of the mirror 1001 near the deflection axis. The forms of address electrodes 1003a and 1003b are changed so as to even out the area sizes on the left and right sides of the deflection axis of the mirror 1001.

Then, stoppers 1007 are placed nearby the deflection axis, and the sides, of each mirror 1001 so as to share a stopper 1007 between the respective adjacent mirrors 1001. And the mirror 1001 comes into contact with the corner of the stopper 1007 at the time of the mirror 1001 being deflected by a coulomb force makes the deflection angle of the mirror 1001 constant, thereby determining the reflection of the illumination light in one direction. An appropriate adjustment of the height or such of the stopper 1007 makes it possible to determine the deflection angle of the mirror 1007. The sharing of the stopper 1007 between the respective mirrors 1001 makes it possible not only to reduce the number of stoppers 1007 than that of the conventional technique, but also to enable a control for reflecting the illumination light at approximately the same as the adjacent mirror 1001.

As for the configuration other than the above description, the elastic hinges 1002a and 1002b, address electrodes 1003a and 1003b and stoppers 1007 are placed symmetrically about a point of the center of the mirror 1001 likewise the configuration of FIG. 9A. Note that the elastic hinges 1002a and 1002b are preferably to be placed so as to maximize and equalize the area sizes of the address electrodes 1003a and 1003b on the left and right sides of the deflection axis of the mirror 1001. By placing the elastic hinges at the edges or corners of the mirror thusly makes it possible to place the address electrodes 1003a and 1003b, and such, nearby the center part on the mirror 1001 and increase the area size of the address electrodes 1003a and 1003b nearby the center part. This configuration results in increasing the Coulomb force for deflecting the mirror 1001.

The top right drawing of FIG. 10 is a side view of the cross-section of the line E-E' of the plain view diagram of the mirror element shown on the top left side of FIG. 10.

A support layer 1006 with both edges attached to the two elastic hinges 1002a and 1002b supports the mirror 1001. The individual elastic hinges 1002a and 1002b are connected to the respective hinge electrodes 1005 corresponding to the respective elastic hinges 1002a and 1002b disposed on a substrate 1004. The address electrodes 1003a and 1003b are placed on the substrate 1004 positioned under the mirror 1001, with the address electrode 1003a on the left side of the mirror 1001 being placed symmetrically about a point of the center of the mirror 1001 with respect to the address electrode 1003b on the right side of the mirror 1001. And the individual address electrodes 1003a and 1003b are provided with electric circuit connections for applying a voltage Va from a control circuit (not shown in a drawing herein). Also configured is that the stopper 1007 is placed nearby the elastic hinges 1002a and 1002b so as to make the mirror 1001 comes into contact with a corner of the stopper 1007 when the mirror 1001 is deflected.

The bottom left drawing of FIG. 10 is a side view of the cross-section of the line F-F' of the plain view diagram of the mirror element shown on the top left of FIG. 10.

By applying a voltage to the address electrode 1003a on the left side (with a voltage not being applied to the other address electrode 1003b), a coulomb force is generated between the address electrode 1003b on the left and mirror 1001 to draw the mirror 1001 of the mirror element 1000 to deflect to the left side. And the mirror 1001 comes into contact with the corner of the stopper 1007 that is shared with the adjacent mirror 1001 to maintain a constant deflection angle of the mirror 1001. An illumination of the incident light in the state of maintaining the deflection angle of the mirror 1001 reflects the illumination light in a prescribed direction.

The description below explains a method for generating a high-grade gray scale by controlling the mirror elements of the embodiments 1 and 2.

Figure 11A:
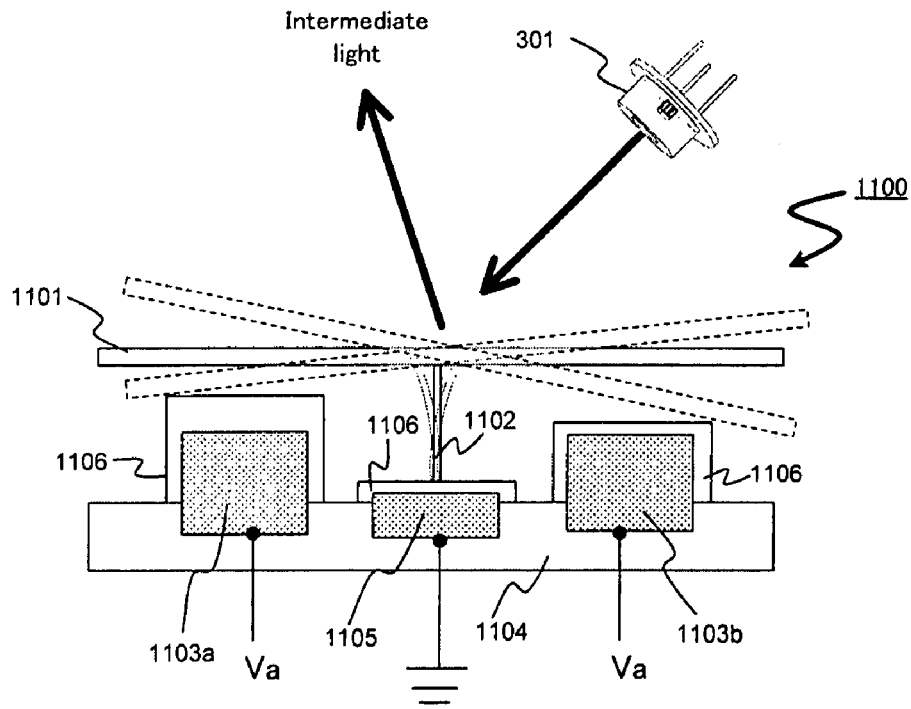
FIG. 11A is a cross-sectional diagram of a mirror element according to the embodiments 1 and 2 reflecting only a part of incident light to a projection optical system by deflecting a mirror.

FIG. 11A is a cross-sectional diagram of a mirror element according to the embodiments 1 and 2 reflecting only a part of incident light to a projection optical system by deflecting a mirror.

An address electrode 1103a on the left side is configured to have an appropriate height so that only a part of the reflection light is incident to the eye of the projection lens when the mirror 1101 shown in FIG. 11A is deflected to come into contact with the address electrode 1103a on the left side. The mirror 1101 is supported by an elastic hinges 1102 attached to the corners or edges of the mirror 1101, and the elastic hinge 1102 is connected to hinge electrodes 1105 which are grounded within a substrate 1104, likewise the mirror elements 800, 900 and 1000 described for the embodiments 1 and 2. And two address electrodes 1103a and 1103b are placed on the substrate 1104 positioned under the mirror 1101, with the individual electrodes 1103a, 1103b and 1105 being covered with an insulation covering.

Figure 5:
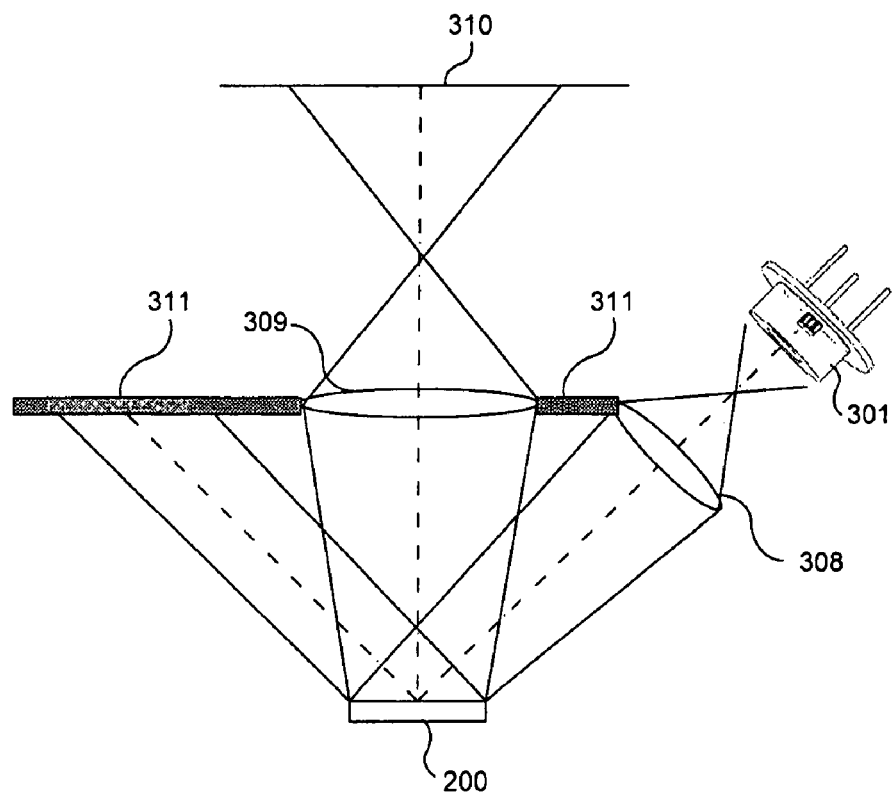
FIG. 5 exemplifies a simplified projection apparatus comprising a mirror device.
Figure 6:
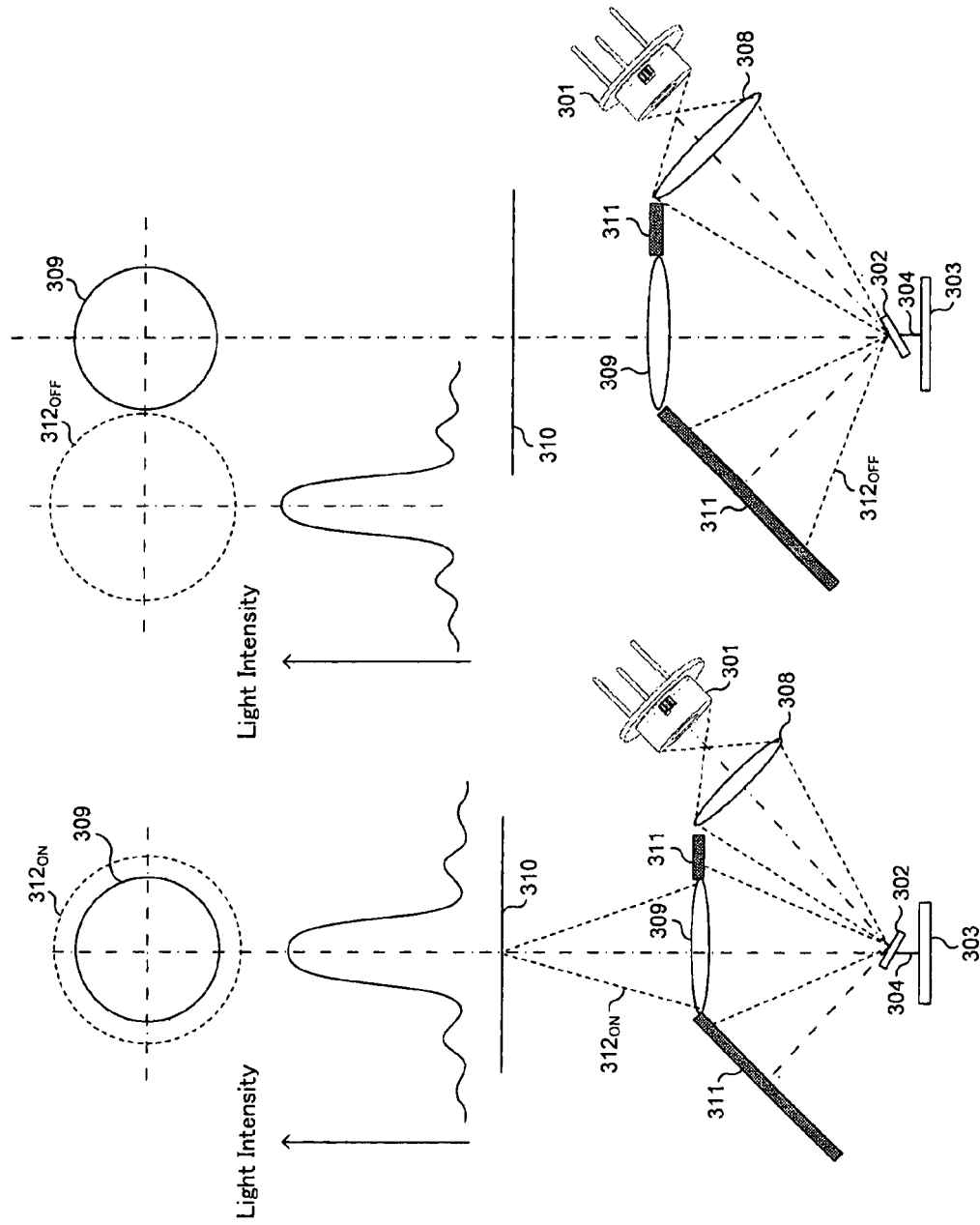
FIG. 6A illustrates the eye and range of light flux of a projection lens and the intensity of light when a mirror element is oriented in an ON light state in the projection apparatus shown in FIG. 5.
FIG. 6B illustrates the eye and range of light flux of a projection lens and the intensity of light when a mirror element is oriented in an OFF light state in the projection apparatus shown in FIG. 5.
Figure 7:
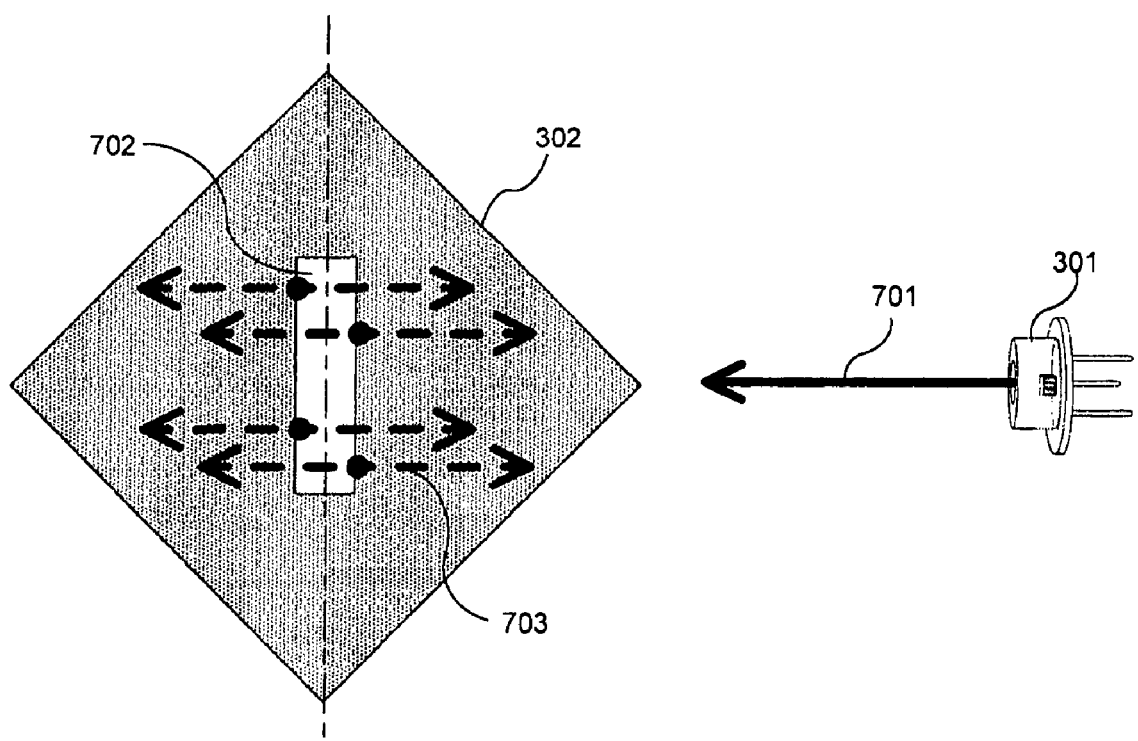
FIG. 7 illustrates a mirror comprising an opening part at the center of the support layer of the mirror, with a reflection member being layered on the opening part.
Figure 11B:
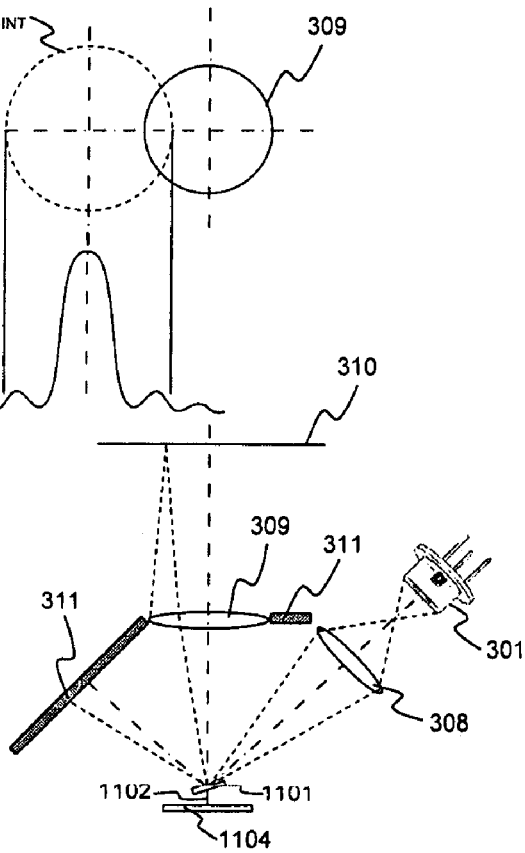
FIG. 11B illustrates the eye and range of a light flux of a projection lens and an intensity of light when the mirror element of FIG. 11A is oriented in an intermediate light state in the projection apparatus shown in FIG. 5.

FIG. 11B illustrates the eye and range of a light flux of a projection lens and an intensity of light when the mirror element of FIG. 11A is oriented in an intermediate light state in the projection apparatus shown in FIG. 5.

When a voltage is applied to the address electrode 1103a on the left side of FIG. 11A, the mirror 1101 is deflected by a coulomb force and comes into contact with the address electrode 1103a on the left side. The illumination light is illuminated on the hitting mirror 1101 from the light source 301 through the illumination optical system 308 and the illumination light is reflected on the mirror 1101 so as to enter a part of the eye of the projection lens 309. Then, a part of reflection light $312_{INT}$ incident to the projection lens is converged by the projection lens 309 and the reflection light $312_{INT}$ is projected onto the individual pixels corresponding to the respective mirror elements on a screen 310. In this event, the intensity of light at the center of the eye of the projection lens 309 is lower than that of an ON light state. Also, the quantity of the light incident to the entirety of the eye of the projection lens 309 is also lower than that of the ON light state. This makes it possible to darken a projected image.

As such, an intermediate light state is generated by adjusting the height of an address electrode appropriately makes it possible to increase the number of gray scales of light. As a result, the brightness of an image can be adjusted more minutely and a projection of a good contrast image is enabled.

Moreover, by oscillating the mirror freely can also generate an intermediate light.

FIG. 12A is a cross-sectional diagram of the mirror element shown in FIG. 11 delineating the situation of repeating a reflection, and no reflection, of incident light to a projection light path by freely oscillating a mirror.

Figure 1A:
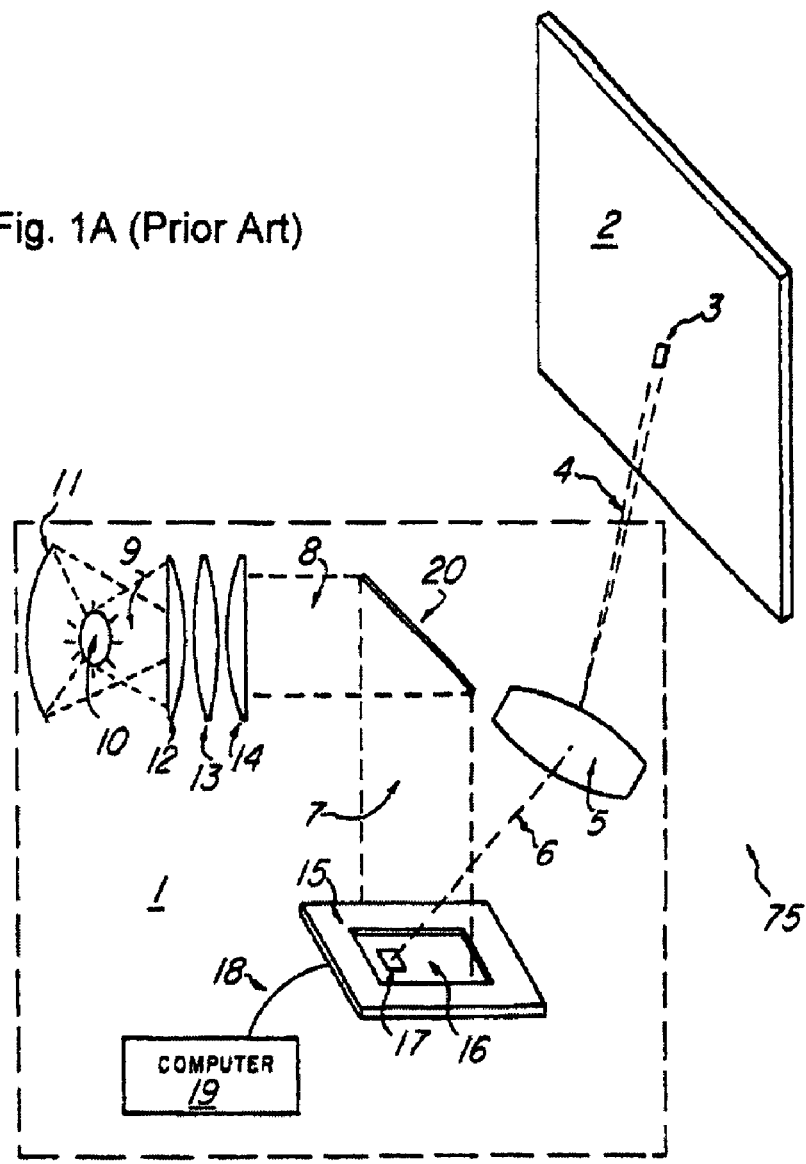
FIG. 1A shows a prior art illustrating the basic principle of a projection display using a micromirror device.
Figure 1B:
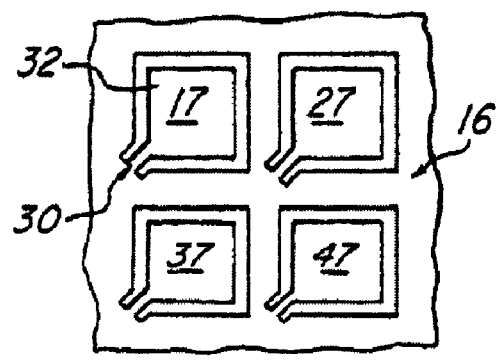
FIG. 1B shows a prior art illustrating the basic principle of a micromirror device used for a projection display.
Figure 1C:
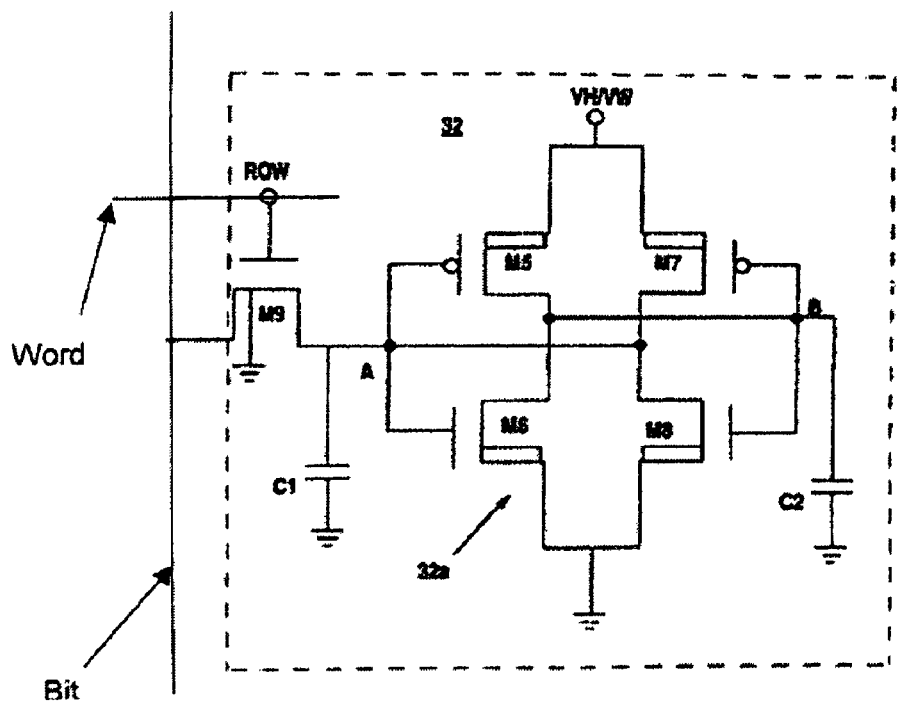
FIG. 1C shows an example of the driving circuit of prior arts.
Figure 1D:
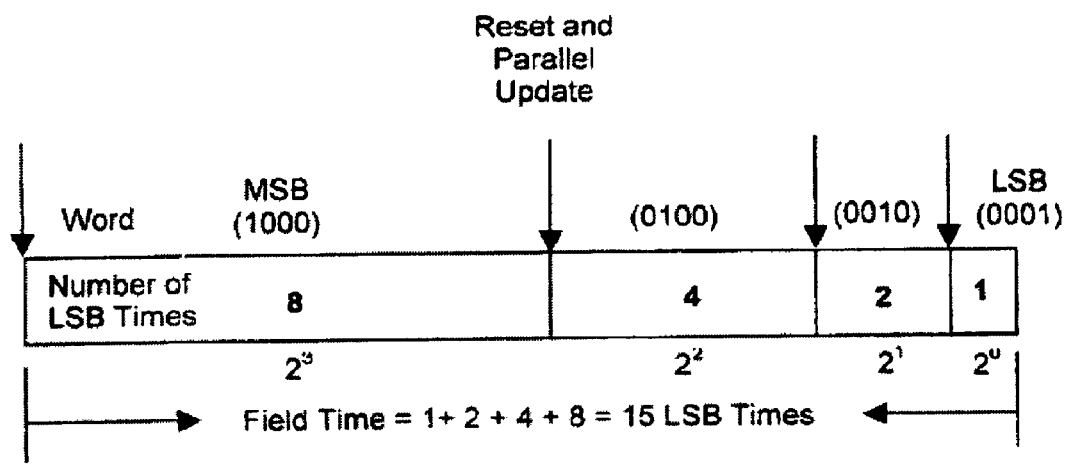
FIG. 1D shows the scheme of Binary Pulse Width Modulation (Binary PWM) of a conventional digital micromirror for generating grayscale.
Figure 2:
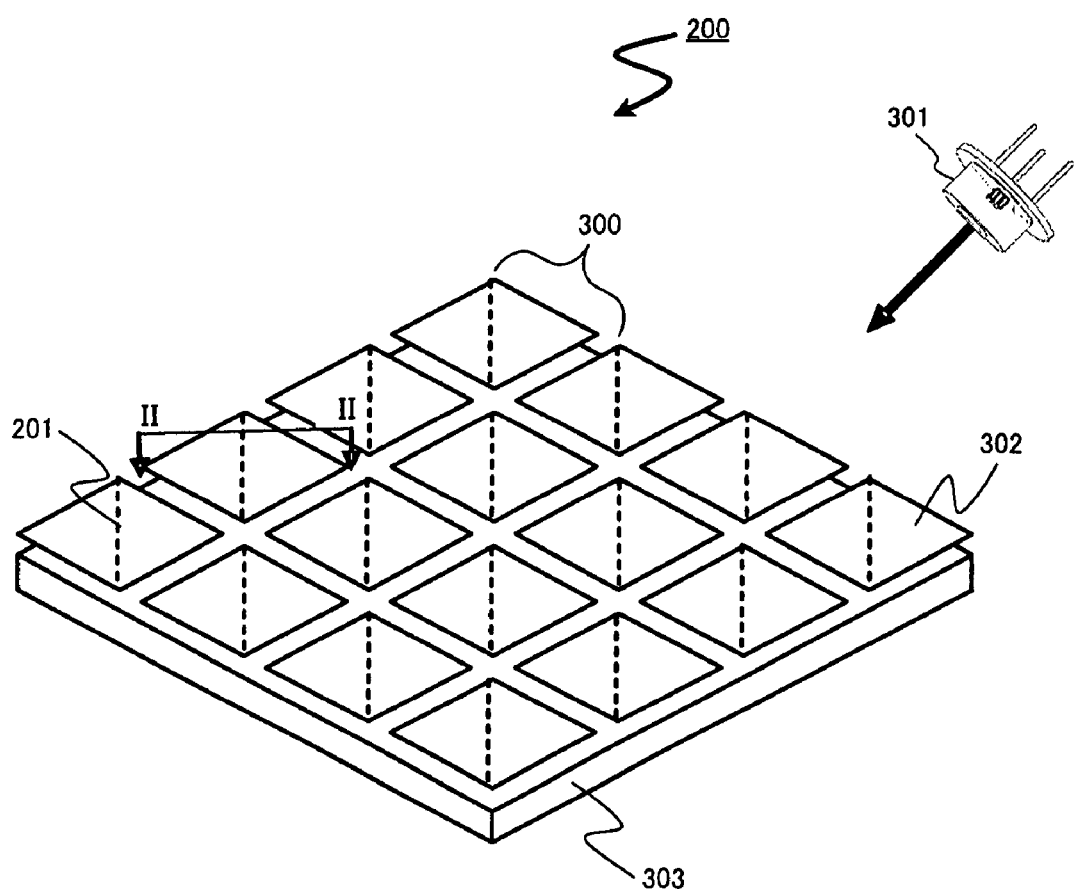
FIG. 2 is a diagonal view of a mirror device arraying, in two-dimension on a device substrate, mirror elements controlling a reflection direction of incident light by deflecting the mirror.
Figure 3A:
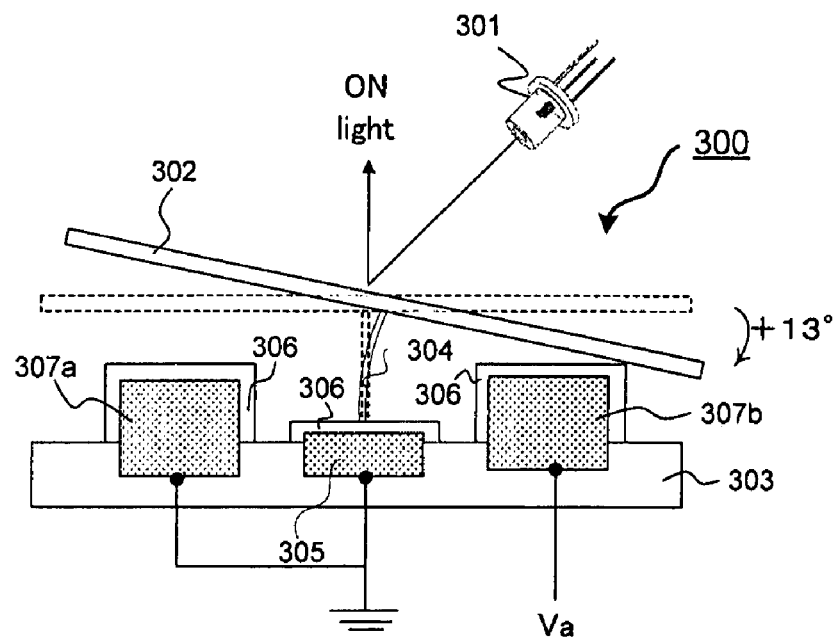
FIG. 3A is a cross-sectional diagram of a mirror element reflecting incident light to a projection optical system by deflecting the mirror.
Figure 3B:
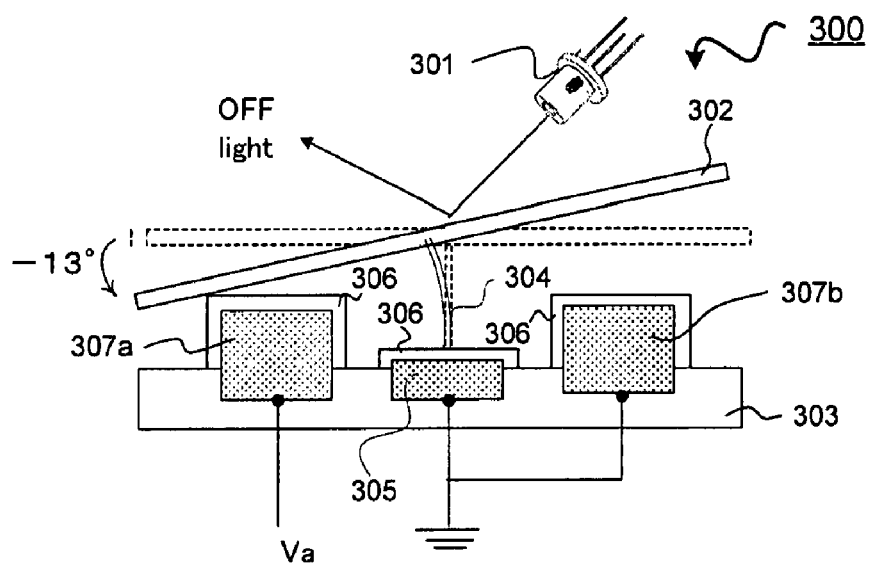
FIG. 3B is a cross-sectional diagram of a mirror element not reflecting the incident light to the projection optical system by deflecting the mirror.
Figure 4:
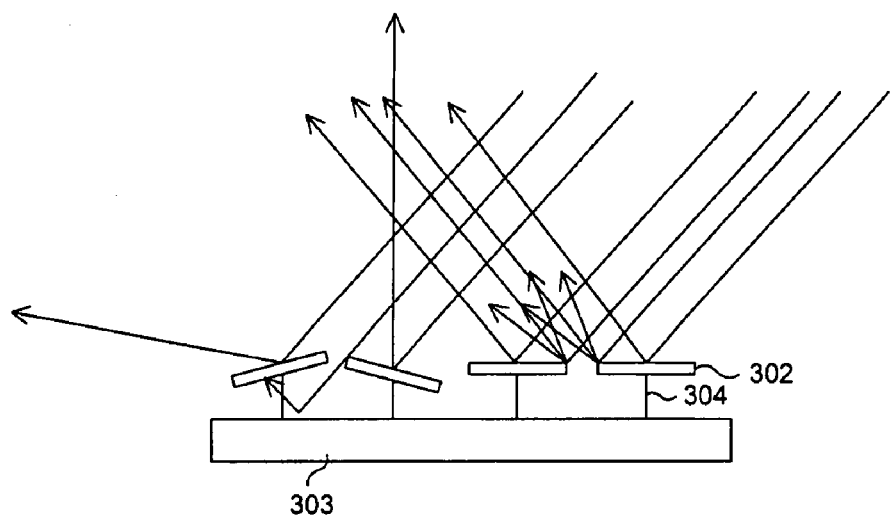
FIG. 4 is a cross-sectional diagram exemplifying a situation of operating each mirror element formed on the device substrate shown in FIG. 2.

Starting from an either state of the ON light state of FIG. 3A or the OFF light state of FIG. 3B in either of which the mirror 1101 of the embodiments 1 or 2 is already deflected, the voltage of the address electrode 1103a or 1103b is set to "0" volt. As a result, the coulomb force generated between the mirror 1101 and address electrode 1103a or 1103b is erased so as to make the mirror 1101 performing a free oscillation within the range of a specific deflection angle in accordance with the characteristic of the elastic hinges 1102. The illumination light is reflected to the projection lens within the range of the deflection angles in which the mirror 1101 becomes the ON light state depending on the free oscillation of the mirror 1101. A repetition of such a free oscillation of the mirror 1101 changes over frequently between the ON light and OFF light states. A setting of the quantity of light reflected as the ON light at the time of the mirror 1101 deflecting one "return trip" between the deflecting angle of the ON light state and that of the OFF light state and a control of the number of times of the free oscillation of the mirror 1101 make it possible to adjust the intensity of light reflecting onto the projection lens.

FIG. 12B illustrates the eye, and the range of a light flux, of a projection lens and an intensity of light when the mirror element according to the present embodiment is operated in a free oscillation state at the projection apparatus shown in FIG. 5.

The assumption here is that a voltage is applied to either of the address electrodes 1103a and 1103b and the mirror 1101 is retained in the deflection angle of ON light state or OFF light state. Here, a reduction of the voltage being applied to the address electrode 1103a or 1103b, or a cancellation of the voltage, puts the mirror 1101 in a free oscillation state. When the mirror 1101 is in the free oscillation state, the illumination light emitted from the light source 301 is illuminated on the mirror 1101. Then, the mirror 1101 performing the free oscillations between the deflection angle of the ON light state and that of the OFF light state changes over frequently among the ON light state, intermediate state and OFF light state, repeating the state of the complete light incident to the eye of the projection lens 309, that of a part of the light incident thereto and that of none of the light incident thereto. A control of the number of times of the free oscillations of the mirror 1101 makes it possible to make a quantity of light smaller than at the time of maintaining the mirror 1101 in the ON light state enter the projection lens 309. In other words, it is possible to generate a quantity of light between the ON light and OFF light states. A control of the free oscillation of the mirror 1101 makes it possible to adjust the quantity of light more minutely and project an image in higher-level gradation than a conventional image. Also, the range of deflection angles of the free oscillations of the mirror 1101 can be controlled in the range of narrower deflection angles than that of the deflection angles of the ON light state or OFF light state.

Note that the mirror device comprising a free oscillation state can be controlled in longer life and low voltage as compared to the one comprising the two states of the ON light and OFF light.

The next is a description on a projection apparatus comprising the mirror device according to the embodiments 1 and 2.

The projection apparatus includes a single-plate projection apparatus and multi-plate projection apparatus, to both of which the mirror device according to the embodiments 1 and 2 is applicable.

<Single-Plate Projection Apparatus>

Described here is an example of the single-plate projection apparatus comprising one mirror device put forth in the present embodiment.

Figure 13:
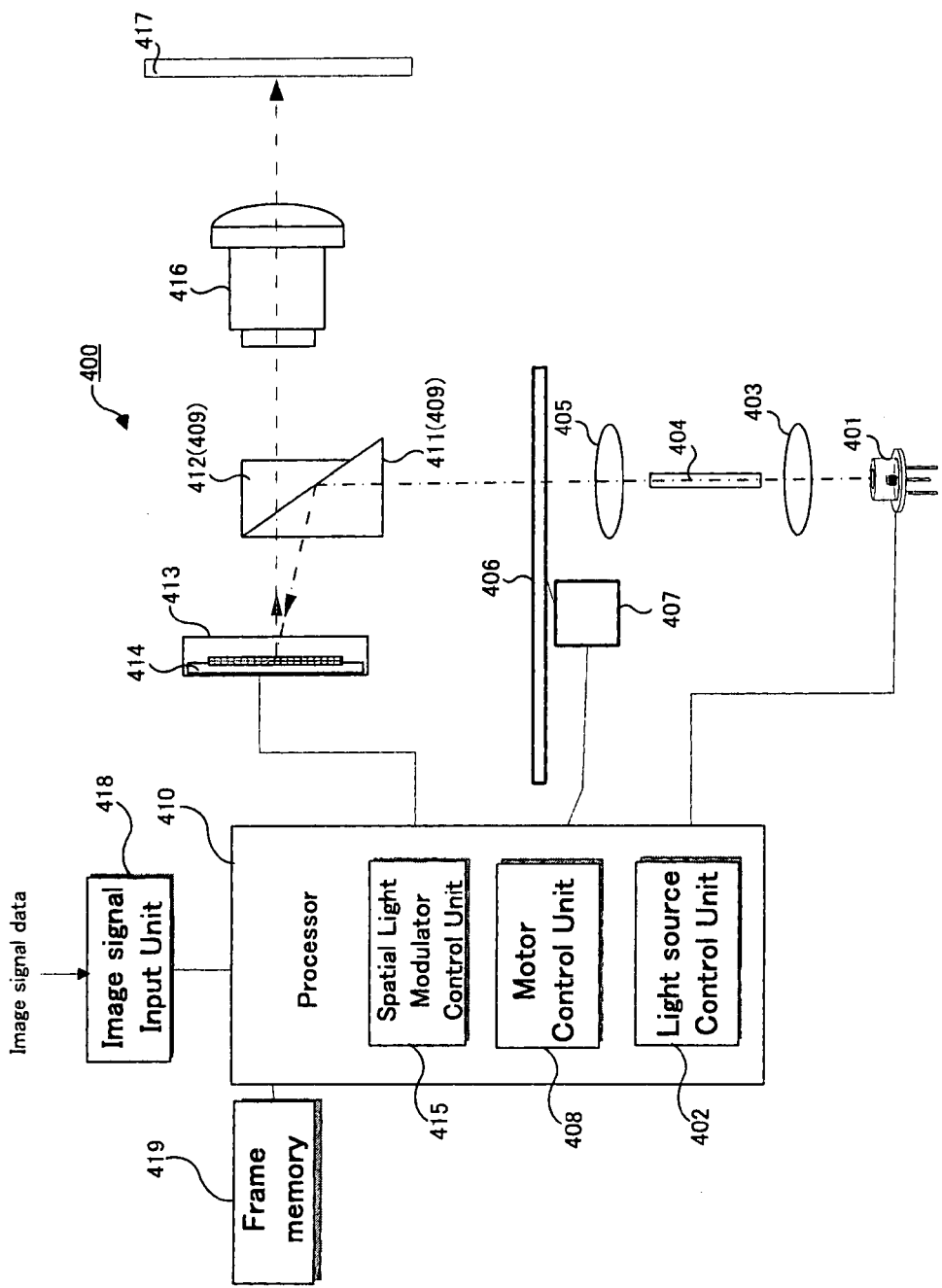
FIG. 13 is a configuration diagram of a single-plate projection apparatus comprising a mirror device according to the present embodiment.

FIG. 13 is a configuration diagram of a single-plate projection apparatus comprising a mirror device put forth in the present embodiment.

The single-plate projection apparatus 400 comprises the following constituent components.

A light source 401 emits the light for projecting an image. A light source control unit 402 that includes a processor 410 to control the light source 401. The light source 401 may be an arc lamp light source, a laser light source or a light emitting diode (LED). The light source 401 may even be constituted by a plurality of sub-light sources. The number of the sub-light sources to be lit is controlled by a light source control unit 402, thereby adjusting the light intensity.

Also, the light source control unit 402 controls the position and the turning on and off of the sub-light sources to control the light emission of the light source and the light intensity projected from the light source.

If the light source 401 has a plurality of laser light sources with different wavelengths, the light source control unit 402 selects among the individual laser light sources for controlling of a color of incident light. Therefore, this configuration does not require a color wheel 406 described later. Also it is possible to carry out a pulse emission of light of a laser light source or of light emitting diode (LED) light source.

When using a near-parallel flux of light with a small light dispersion angle, such as a laser light source, the numerical aperture NA of an illumination light flux and the flux reflecting on the mirror device 414 can be reduced based on the relationship of etendue. By this, while avoiding an interference of the illumination light flux prior to being reflected on the mirror device 414 with the projection light flux after being reflected thereon, these fluxes can be moved close to each other. As a result, the size of the mirror can be reduced and also the deflection angle of the mirror can be smaller. And the making of the deflection angle of mirror smaller by moving the illumination light flux and projection light flux closer to each other makes it possible to shorten the difference of light path lengths between the incident light and reflection light passing through a package 413 and reduce the difference of rates of light transmission through the package 413. That is, larger light quantity of incident light and reflection light enter the mirror array and projection path. Therefore, by reducing the deflection angle of the mirror using a laser light source enables a projection of a brighter image. A condenser lens-1 403 converges the light from the light source 401. A rod integrator 404 uniforms an intensity of light. A condenser lens-2 405 converges the light emitted from the rod integrator 404.

A color wheel 406 is constituted by a filter member that is constituted by a plurality of filters. Each of the individual filters extracts a specific wavelength. As an example, the filter member can be constituted by three filters, i.e., a filter for extracting the light of the wavelength of red, one for extracting the light of the wavelength of green and one for extracting the light of the wavelength of blue.

And, each filter of a light-passing path can be changed over by a color wheel drive unit 407 so as to rotate or slide the filter member constituted by the filters. The filter may have a characteristic of polarization. A motor control unit 408 of the processor 410 controls the color wheel drive unit 407. The color wheel drive unit 407 controls the rotation or the slide speed of the filter.

A total internal reflection (TIR) prism 409 is implemented with triangle prisms, i.e., a first prism 411 and a second prism 412. The first prism 411 has the role of totally reflecting the incident light. As an example, the first prism 411 totally reflects the incident light to the light path entering the mirror device. The totally reflected light is modulated by the mirror device and reflected to the second prism 412. The second prism 412 transmits the reflection light, which is incident thereto at an angle smaller than a critical angle and for modulation by the mirror device.

The mirror device 414 is housed in a package 413. A processor 410 of the control unit 415 implemented in a spatial light modulator controls the mirror device 414.

A projection lens 416 has the role of enlarging the light reflected and modulated by the mirror device 414 so as to project the light on a screen 417.

The processor 410, comprising a light source control unit 402, a motor control unit 408 and an SLM control unit 415, is capable of synchronously controlling each of the aforementioned control units by combining them. The processor 410, being connected to an image signal input unit 418, processes image signal data input therefrom. The processor 410, further being connected to the frame memory 419, is capable of sending the processed image signal data.

The image signal input unit 418 inputs the incoming image signal data to the processor 410.

And the frame memory 419 is capable of accumulating the image signal data of a single screen processed by the processor 410.

Such is the constituent members comprised by the single-plate projection apparatus 400 shown in FIG. 13.

The description below explains the principle of projecting a color image at the single-plate projection apparatus 400 shown in FIG. 13.

In the single-plate projection apparatus 400, the light output from the light source 401 enters a filter of the color wheel 406 through the condenser lens-1 403, rod integrator 404 and condenser lend 405.

The light generated by extracting only the light of a specific wavelength by a filter of the color wheel 406 enters the first prism 411 of the TIR prism 409. And the light reflected by the first prism 411 of the TIR prism 409 enters the mirror device 414 housed in the package 413.

The light reflected on, and modulated by, the mirror element of the mirror device 414 re-enters the TIR prism 409 and transmits itself through the second prism 412 thereof. Then the transmitted light is projected on the screen 417 through the projection lens 416.

When projecting an image as such, the light source control unit 402 at the processor 410 controls the quantity of light projected from the light source based on the image signal data incoming through the image signal input unit 418. The motor control unit 408 is controlled based on the image signal data, and the motor control unit 408 controls the color wheel drive unit 407. The color wheel drive unit 407 controls the process of changing over filters of the color wheel 406. Furthermore, the SLM control unit 415 controls such as a plurality of light modulation elements of the mirror device 414 based on the image signal data.

The single-plate projection apparatus 400 configured as described above divides a period for displaying one image (i.e., one frame) into sub-frames corresponding to the individual wavelengths of light in relation to the respective wavelengths of light, e.g., a wavelength corresponding to red, one corresponding to green and one corresponding to blue. And the light of each wavelength is illuminated onto the mirror device 414 in accordance with a period of each sub-frame. In this event, the period of each sub-frame, the period of modulating the light of each wavelength at the mirror device 414 and the period of stopping a filter of the color wheel 406 are mutually dependent. A selective reflection of the incident light at the mirror device 414 enables only the light of the individual wavelength reflected to the projection light to be projected onto the screen. And a sequential projection of lights of the individual wavelengths in accordance with the respective sub-frame periods enables a projection of a color image.

The description below explains by an example of a multi-plate projection apparatus comprising a plurality of mirror devices according to the present embodiment.

The multi-plate projection apparatus includes a plurality of light sources, a plurality of mirror devices and a projection lens.

The light source may preferably be a laser light source or a light emitting diode (LED). A plurality of laser light sources may be equipped, with each light source being independently controlled. The independent control of each light source eliminates a necessity of a color filter by turning on/off a laser light source having a prescribed wavelength. The use of a laser light source enables a pulse emission, which has been difficult to achieve with a mercury lamp.

The description below explains the configuration and principle of a two-plate projection apparatus, and a three-plate projection apparatus, as examples of multi-plate projection apparatus comprising mirror devices according to the present embodiment.

<Two-Plate Projection Apparatus>

The two-plate projection apparatus is configured to make two mirror devices respond to two groups of light sources, respectively. And one mirror device modulates the light form one group of light source and another mirror device modulates the light from another group of light source. Then, the reflected and modulated light by each of the mirror devices is synthesized, thereby projecting an image.

As an example, when projecting an image with the lights of wavelengths corresponding to three colors, i.e., red light, green light and blue light, the high visibility green light is modulated by one mirror device, and red or blue lights is modulated by another mirror device in sequence or simultaneously, followed by synthesizing the light modulated by each mirror device and projecting an image.

FIGS. 14A through 14D are configuration diagrams of a two-plate projection apparatus comprising two of a mirror device, according to the present embodiment, housed in one package.

The projection apparatus 500 shown in FIGS. 14A through 14D comprises a green laser light source 501, a red laser light source 502, a blue laser light source 503, illumination optical systems 504a and 504b, two triangle prisms 506 and 509, two mirror devices 520 and 530 which are housed in one package 511, a circuit board 508, a joint member 512, a light shield member 513, a light guide prism 514 and a projection optical system 523.

The next is a description of the constituent components of the projection apparatus 500 shown in FIGS. 14A through 14D.

The individual light sources 501, 502 and 503 are laser light sources as described for the single-plate system and capable of performing a pulse emission. They may be alternatively constituted by a plurality of sub-laser light sources. The light source may use two mercury lamps corresponding to the respective mirror devices. In the case of using the mercury lamps, an equipment of a filter 505 allowing a passage of only a light of a specific wavelength while reflecting other light of wavelengths on the surface of synthesizing the reflection light in a prism 510 described later provides a similar effect as a color filter. Alternatively, using a dichroic prism or dichroic mirror to separate a wavelength of the projected light, enables a display system to project a light of separate wavelength to the mirror device The illumination optical systems 504a and 504b are optical elements such as collector lenses described for the single-plate projection apparatus, and rod integrators, convex lenses or concave lenses.

The prism 510 of a result of combining two triangle prisms 506 and 509 has the role of synthesizing the reflection lights from the two mirror devices 520 and 530. When the prism 510 synthesizes the reflection lights from the individual mirror devices, it may be appropriate to equip the filter 505, such as dichroic filter, allowing a passage of only the light of a specific wavelength while reflecting the other light of wavelengths on the surface of synthesizing the reflection light in a prism 510.

The filter 505 has the same role as a color filter because of a capability of allowing a passage of only the light of a specific wavelength while reflecting the other light of wavelengths. Meanwhile, when using a laser light source emitting the light having a specific polarization direction, a polarization light beam splitter film separating/synthesizing light by using a difference of polarization direction of light on the surface of synthesizing a reflection light in the prism 510 may be used, or a polarization light beam splitter coating may be applied to the aforementioned surface.

The package 511 is similar to the package, which has been described for the single-plate projection apparatus. The package 511 noted in FIGS. 14A through 14D is configured to be capable of housing two mirror devices 520 and 530 within one package 511. The mirror devices 520 and 530 may be housed in separate packages, however.

Note that FIGS. 14A through 14D show the mirror arrays 521 and 531, and device substrates 522 and 532, of the respective mirror devices 520 and 530.

The circuit board 508 is connected to a processor similar to the one described for the single-plate projection apparatus described above. The processor comprises a SLM control unit and a light source control unit. And the processor processes the input image signal data and transmits the processed information to the SLM control unit and light source control unit. The SLM control unit and light source control unit control the mirror device and light source through the circuit board 508 based on the processed information. The control of the mirror device can be synchronized with that of the light source. The input of the image signal data to the processor and other activity have been described for the single-plate projection apparatus and therefore the description is omitted here.

The joint member 512 has the role of joining the prism 510 with the package 511. A material used for the joint member 512 includes a fritted glass for example.

The light shield member 513 has the role of shielding unnecessary light. A material used for the light shield member 513 includes graphite for example. The projection apparatus 500 shown in FIGS. 14A through 14D is provided with the light shield member 513 not only on a part of the bottom of the prism 510 but also on the back of the prism 510.

The light guide prism 514 is a prism of a right-angle triangle cone of a result of adhesively attaching the slope face on the front face of the prism 510 with the bottom of the light guide prism 514 facing upward. And the light guide prism 514 is provided so that the individual light sources 501, 502 and 503, the illumination optical systems 504a and 504b corresponding to the respective light sources and the light axis of the light emitted from the individual light sources 501, 502 and 503 are respectively perpendicular to the bottom of the light guide prism 514. This configuration enables the lights emitted from the individual light sources 501, 502 and 503 to be orthogonal incident to the light guide prism 514 and prism 510. This results in increasing the light transmissions of the light on the incidence surface of the light guide prism 514 and prism 510 when the respective lights emitted from the individual light sources 501, 502 and 503 enters the light guide prism 514 and prism 510.

The projection optical system 523 is an optical element for projecting an appropriate image onto the screen. As an example, members such as a projection lens enlarging the light for projecting an image onto the screen are included.

Note that, when using both of a light source emitting a polarized light and a polarization beam splitter film, a two-plate projection apparatus can be configured by comprising a ½ wavelength plate or ¼ wavelength plate on the bottom surface of the prism 510.

Such is the constituent members comprised by the two-plate projection apparatus 500 shown in FIGS. 14A through 14D.

The description below explains the principle of projection at the two-plate projection apparatus 500 by referring to FIGS. 14A through 14D.

The projection apparatus 500 lets the green laser light 515 incident from the front direction of the prism 510, followed by letting the red laser light 516 or blue laser light 517 sequentially in a time division and making the green laser light 515 and red laser light 516 or blue laser light 517 be reflected to the inclined surface direction of the prism 510 by means of the two mirror devices 520 and 530 of the present embodiment. Then the green laser light 515 and the red laser light 516 or blue laser light 517 which are reflected on the inclined surface side of the prism 510 are synthesized and the image is projected on the screen through the projection optical system 523.

Figure 14A:
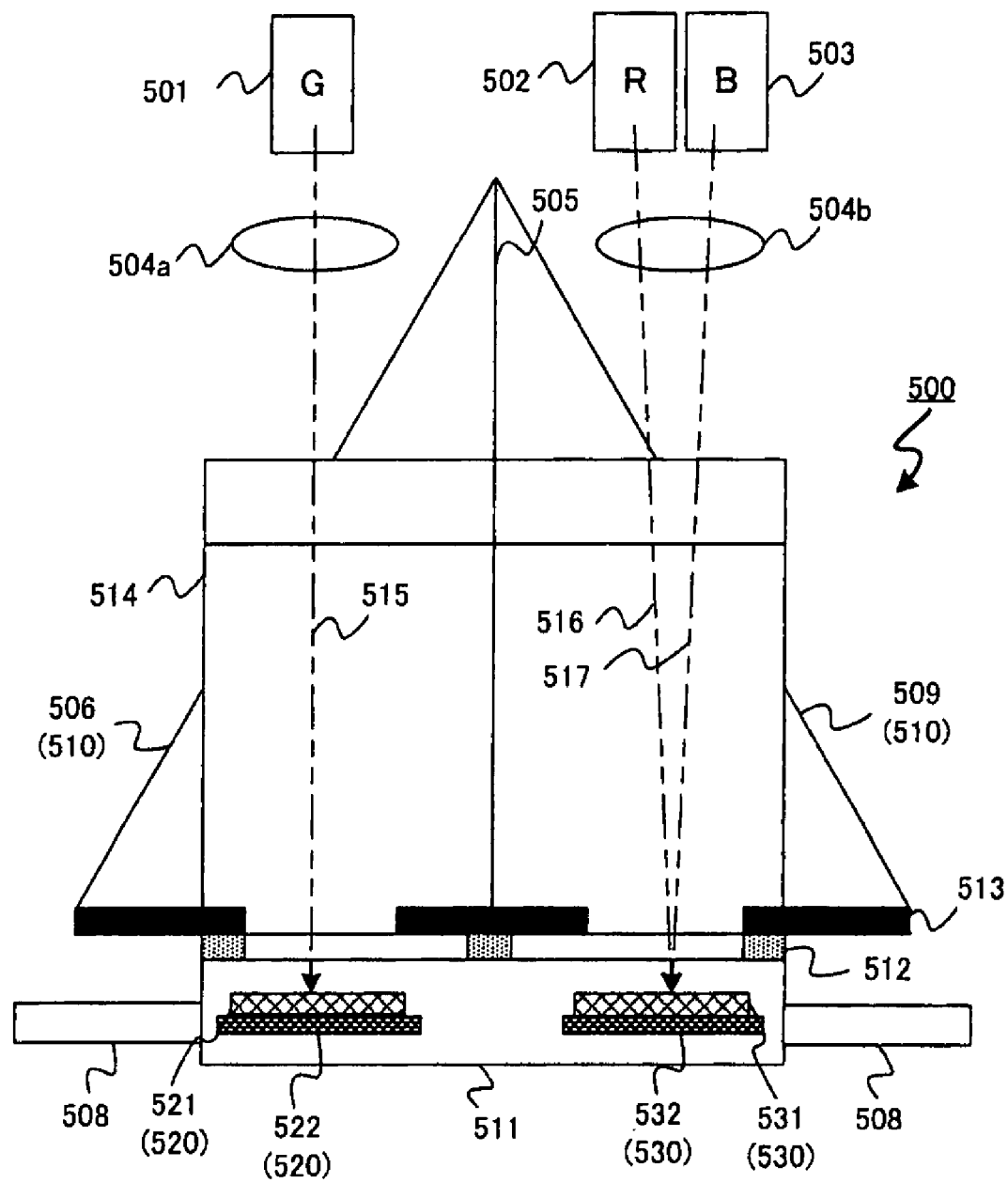
FIG. 14A is a front view diagram of a configuration of a two-plate projection apparatus comprising two mirror devices according to the present embodiment.

FIG. 14A is a front view diagram of a configuration of a two-plate projection apparatus comprising two mirror devices according to the present embodiment.

The next is a description of the principle of projection between the incidence of the individual laser lights 515, 516 and 517 from the front direction of the prism 510 and the reflection of the respective laser lights 515, 516 and 517 to the inclined surface direction of the prism 510 by means of the two mirror devices 520 and 530 by referring to the front view diagram of the two-plate projection apparatus 500 shown in FIG. 14A.

The green laser light 515 and the red laser light 516 or blue laser light 517 emitted respectively from the green laser light source 501 and the red laser light source 502 or blue laser light source 503 go through the illumination optical systems 504a and 504b corresponding to the green laser light 515 and the red laser light 516 or blue laser light 517, and enters the prism 510 through the light guide prism 514. Then the green laser light 515 and the red or blue laser light 516 or 517 transmit themselves in the prism 510, and enters the package 511, which is joined, to the bottom of the prism 510.

Then, after pass through the package 511, the green laser light 515 and the red or blue laser lights 516 or 517 enter the two mirror devices 520 and 530 which are housed in a single package 511 and which correspond to the individual laser lights 515, 516 and 517. Having been modulated at the respective mirror devices 520 and 530, the individual laser lights 515, 516 and 517 are reflected to the inclined surface direction of the prism 510.

Figure 14B:
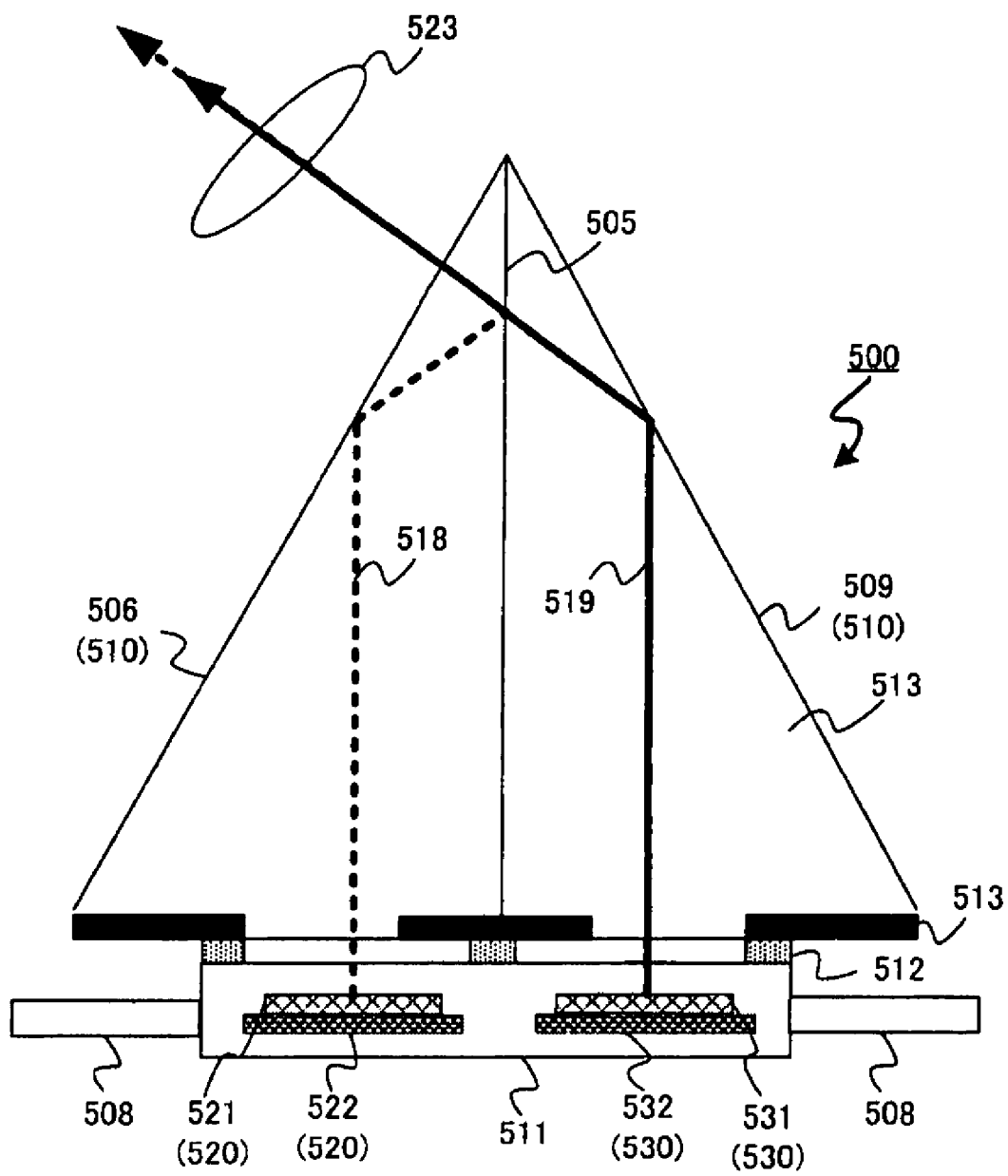
FIG. 14B is a rear view diagram of a configuration of a two-plate projection apparatus comprising two mirror devices according to the present embodiment.

The next is a description of the principle of projection starting from the reflection of the individual laser lights 515, 516 and 517 at the respective mirror devices 520 and 530 to the projection of an image by referring to the rear view diagram of the two-plate projection apparatus 500 shown in FIG. 14B.

FIG. 14B is a rear view diagram of a configuration of a two-plate projection apparatus comprising two of a mirror device according to the present embodiment.

A green laser ON light 518 and a red or blue laser ON light 519 reflected to the inclined surface direction of the prism 510 by means of the respective mirror devices 520 and 530 in the ON state are re-transmitted through the package 511, thus entering the prism 510.

Then, the green laser ON light 518 and the red or blue laser ON light 519 are respectively reflected on the inclined surface of the prism 510. Then the green laser ON light 518 is rereflected on the film 505 allowing a passage of only a light of a specific wavelength while reflecting the light of other wavelengths. Meanwhile, the red or blue laser ON light 519 is transmitted through the film 505.

Then, the green laser ON light 518 and the red or blue laser ON light 519 are synthesized on the same optical path and incident together to the projection optical system 523, thereby projecting a color image. Note that the optical axes of the respective ON lights 518 and 519 emitted to the projection optical system 523 from the prism 510 are preferably to be perpendicular to the emission surface of the prism 510.

Therefore, the configuration as described above enables a projection of image at the two-plate projection apparatus 500 comprising two of the mirror device described above.

FIG. 14C is a side view diagram of a configuration of a two-plate projection apparatus comprising two of the mirror device described above.

The green laser light 515 emitted from the green laser light source 501 enters the light guide prism 514 perpendicularly through the illumination optical system 504a.

After the light is transmitted through the light guide prism 514, the green laser light 515 transmits itself through the prism 510 joined with the light guide prism 514 and enters the mirror array 521 of the mirror device 520 housed in the package 511.

The mirror array 521 reflects the incident green laser light 515 by the deflection angles of the mirror in either of the ON state in which the entire reflection light enters the projection optical system 523, of the intermediate light state in which a portion of the reflection light enters the projection optical system 523 or of the OFF light state in which none of the reflection light enters the projection optical system 523.

A green laser light 524 selecting the ON light state is reflected on the mirror array 521, and thus the entire light enters the projection optical system 523.

Meanwhile, a laser light 525 selecting the intermediate state is reflected on the mirror array 521, and thus a portion of the light enters the projection optical system 523.

And a laser light 526 selecting the OFF light is reflected by the mirror array 521 toward the light shield layer 513 featured on the back surface of the prism 510. And the reflected laser light 526 is absorbed in a light shield layer 513.

By this, the green laser lights by the ON light in the maximum quantity of light, by the intermediate light in the intermediate quantity of light between the ON light and OFF light, or by the OFF light in the zero quantity of light are incident to the projection optical system 523.

Note that the making of the deflection angle of the mirror stay between the ON light state and OFF light state makes it possible to create an intermediate light state. And the making of the mirror in a free oscillation as described above repeats the deflection angles of the mirror at a deflection angle constituting the ON state, at the angle constituting the intermediate state and at the angle constituting the OFF state. Here, a control of the number of free oscillations makes it possible to adjust a quantity of light incident to the projection optical system 523.

As such, the generation of a quantity of light in the intermediate state enables the projection of an image with a high grade of gray scale.

It is possible to carry out a similar process on the reverse surface, that is, on the side having the red laser light source 502 and blue laser light source 503.

FIG. 14D is a plain view diagram of a two-plate projection apparatus comprising two of a mirror device according to the present embodiment.

The light of an OFF light state can be absorbed by the light shield layer 513 on the back without being reflected on the prism 510 by placing the individual mirror devices 520 and 530 so as to be 45 degrees in relation to the four sides of the outer circumference of the package 511 on the same horizontal plane as shown in FIG. 14D.

<Three-Plate Projection Apparatus>

The next is a description on a three-plate projection apparatus.

The three-plate projection apparatus makes three mirror devices respond to the respective lights of three groups of light sources and makes the individual mirror devices modulate the individual lights from the respective light sources. Then the individual lights modulated by the respective mirror devices are synthesized for projecting an image.

As an example, when projecting an image by the lights of three colors, i.e., red light, green light and blue light, the respective mirror devices continuously modulate the individual lights and the modulated individual lights are synthesized, thereby projecting a color image.

Figure 15:
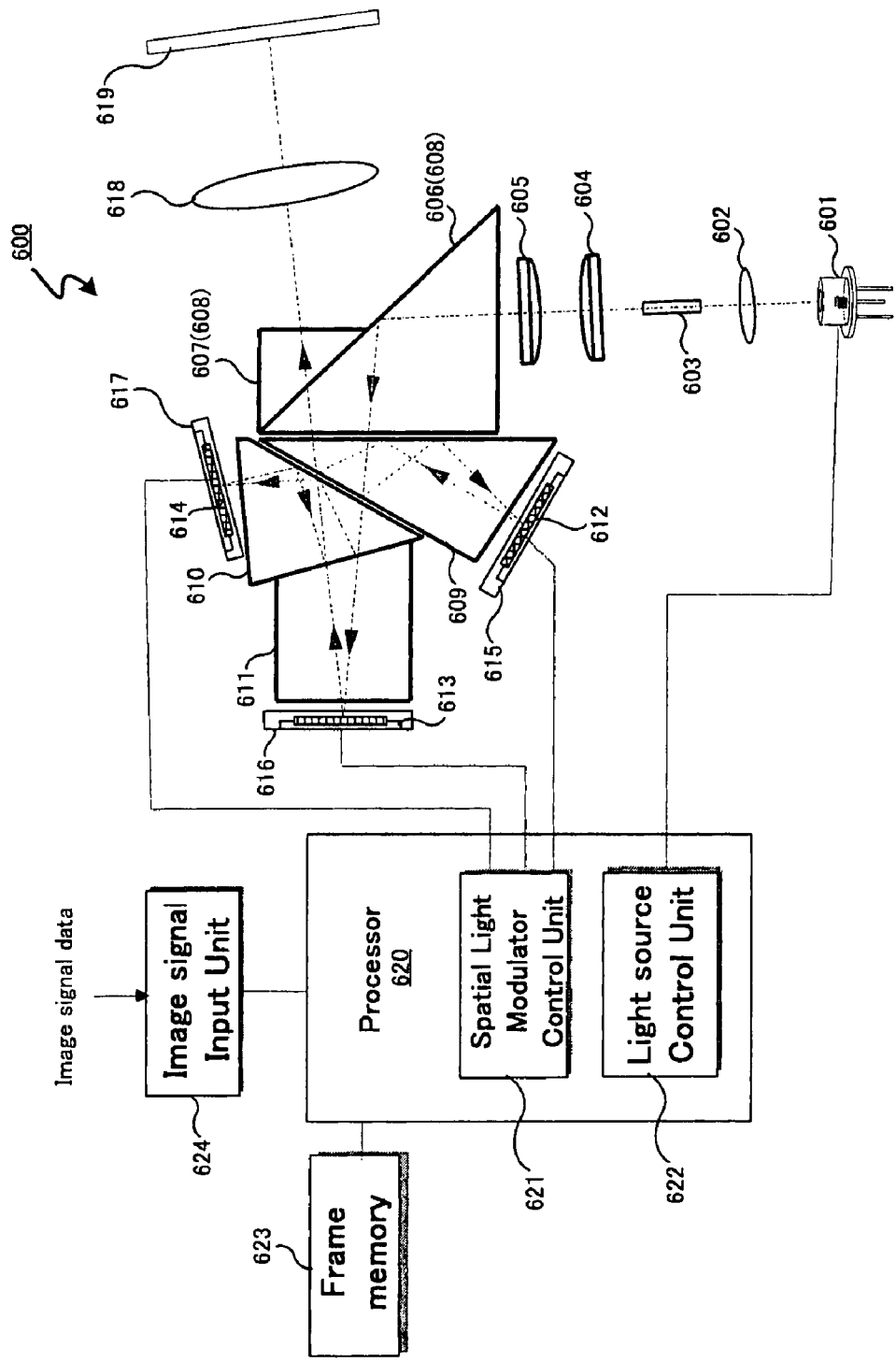
FIG. 15 is a configuration diagram of a three-plate projection apparatus. comprising three mirror devices, according to the present embodiment, which are housed in the respective package.

FIG. 15 is a configuration diagram of a three-plate projection apparatus comprising three of a mirror device, according to the present embodiment, housed in the respective packages.

The projection apparatus 600 shown in FIG. 15 comprises a light source 601, a condenser lens-1 602, a rod integrator 603, a condenser lens-2 604, a condenser lens-3 605, a TIR prism 608, a first dichroic prism 609, a second dichroic prism 610, a third prism 611, individual mirror devices 612, 613 and 614, and individual packages 615, 616 and 617 housing the respective mirror devices 612, 613 and 614 and a projection lens 618.

The next is a description of constituent members of the projection apparatus 600 shown in FIG. 15.

The light source 601 may be a mercury lamp source, a laser light source, an LED, or such, likewise the light source described for the single-plate projection apparatus and two-plate projection apparatus describe above. The configuration and operation of the light source, such as the sub-light source or pulse emission, are similar to the light source for the projection apparatus described above and therefore the description is omitted here.

The condenser lens-1 602, rod integrator 603, condenser lens-2 604 and condenser lens-3 605 are similar to those described for the single plate projection apparatus and the condenser lens-1 602, condenser lens-2 604 and condenser lens-3 605 have the role of focusing the light. Meanwhile, the rod integrator 603 has the role of evening out a light intensity.

The TIR prism 608 is similar to the prism described for the single-plate projection apparatus described above and therefore the description is omitted here. FIG. 15 shows the TIR prism 608 used for the three-plate projection apparatus includes a first prism 606 and a second prism 607.

The first dichroic prism 609 and second dichroic prism 610 are prisms letting only the light of a specific wavelength pass while reflecting the light of other wavelengths. And the third prism 611 is a common prism. Note that the first dichroic prism 609 and second dichroic prism 610 may each implements a dichroic mirror.

As an example, FIG. 15 shows the case of configuring the first dichroic prism 609 as a prism reflecting only the light of the wavelength equivalent to red while letting the light of other wavelengths pass and the second dichroic prism 610 as one reflecting only the light of the wavelength equivalent to blue while letting the light of other wavelengths pass. And the drawing shows the case of configuring the third prism 611 as one making the light of the wavelength equivalent to green travel straight.

The individual packages 615, 616 and 617 house the respective mirror devices 612, 613 and 614 according to the present embodiment.

The projection lens 618 has the role of enlarging individual lights synthesized after the individual lights are reflected and modulated at the respective mirror devices 612, 613 and 614.

A processor 620 is basically similar to the one described for the single plate projection apparatus, and comprises a spatial light modulator control unit 621 and a light source control unit 622. And it processes the input image signal data as described for the single plate projection apparatus.

The spatial light modulator control unit 621, being basically similar to the one described for the single plate projection apparatus, is connected to the individual mirror devices 612, 613 and 614. And it is capable of controlling the individual mirror devices 612, 613 and 614 either independently or synchronously based on the image signal data processed by the processor. It is also capable of controlling the individual mirror devices 612, 613 and 614 synchronously with other constituent members.

The light source control unit 622, being similar to the one described for the single plate projection apparatus, is connected to the light source 601 and apable of controlling the light intensity of the light source, the number of sub-light sources to be lit and such based on the image signal processed by the processor.

Frame memory 623 and an image signal input unit 624 are similar to the ones described for the single plate projection apparatus and therefore the description is omitted here.

Such are the constituent members comprised by the three-plate projection apparatus 600 shown in FIG. 15.

The next is a description of the principle of projection of a color image at the three-plate projection apparatus 600 shown in FIG. 15.

In the three-plate projection apparatus 600, the light output from the light source 601 is transmitted through condenser lens-1 602, rod integrator 603, condenser lens-2 604, condenser lens-3 605 in sequence and incident to the first prism 606 of the TIR prism 608 at a critical angle or more. Then, the incident light is totally reflected by the first prism 606 of the TIR prism 608.

The totally reflected light enters the first dichroic prism 609. And only the light of the wavelength equivalent to red, among the totally reflected light, is reflected, while the light of other wavelengths are passed, on the emission surface for light of the first dichroic prism 609 and/or on the incident surface for light of the second dichroic prism 610.

Then, as for the light incident to the second dichroic prism 610, only the light of the wavelength equivalent to blue, among the incident light, is reflected, while the light of other wavelength, that is, the light equivalent to green, is passed on the light emission surface of the second dichroic prism 610 and/or the light incident surface of the third prism 611.

The light which enters the third prism 611 and from which the light of wavelengths equivalent to blue and red are removed, that is, the light equivalent to green travels straight in the third prism 611.

Then, the light dispersed to each wavelength is incident to the packages 615, 616 and 617, respectively, which house the respective mirror devices 612, 613 and 614 that are placed on the respective sides of the first dichroic prism 609, second dichroic prism 610 and third prism 611.

The individual lights transmitted through the packages 615, 616 and 617 enter the respective mirror devices 612, 613 and 614 according to the present embodiment. Here, the individual mirror devices 612, 613 and 614 are mutually independently controlled by the spatial light modulator control unit 621 so as to respond to the respective lights based on the image signal processed by the processor 620. The individual mirror devices 612, 613 and 614 modulate, and reflect, the incident respective lights.

Then, the light equivalent to the wavelength of red, reflected by the mirror device 612, re-enters the first dichroic prism 609. Also, the light equivalent to the wavelength of blue, reflected by the mirror device 614, re-enters the second dichroic prism 610. And the light equivalent to the wavelength of green, reflected by the mirror device 613 re-enters the third prism 611.

The light equivalent to the wavelength of red, re-entering the first dichroic prism 609, and the light equivalent to the wavelength of blue, re-entering the second dichroic prism 610, repeat some numbers of reflections in the respective prisms 609 and 610.

Then, the light equivalent to the wavelength of blue overlaps its optical path with that of the light equivalent to the wavelength of green, re-entering the second dichroic prism 610 from the third prism 611, thereby being synthesized.

Then, the light synthesized with the wavelengths equivalent to green and blue enters the first dichroic prism 609 from the second dichroic prism 610.

Then, the light equivalent to the wavelength of red overlaps its optical path with that of the light equivalent to the wavelengths of green and blue, entering the first dichroic prism 609 from the second dichroic prism 610, thereby being synthesized.

The light of a result of synthesizing the individual lights modulated by the respective mirror devices 612, 613 and 614 enters the second prism 607 of the TIR prism 608 at the angle smaller than the critical angle.

Then, the synthesized light is transmitted through the second prism 607 of the TIR prism 608 and is projected to the screen 619 through the projection lens 618.

As such, a color image can be projected at the three-plate projection apparatus.

In such a configuration, as compared to the single-plate image display system described above, since each light of the primary colors is displayed at all times, there will be no visual problem such as the so-referred to as color breakup. Furthermore, effective use of emitted light from the light source provides in principle a bright image.

Such is a description of a projection apparatus comprising a mirror device(s) according to the present embodiment.

The present specification document has described the mirror device, comprising a mirror element which comprises a mirror for reflecting illumination light emitted from a light source, a hinge for supporting the mirror placed on a substrate, a hinge structural body for supporting the hinge, and electrodes for controlling a deflection direction of the mirror placed on the substrate, and in which the hinge is placed so as to traverse the edge of the mirror or the border with an adjacent mirror. Various alternations and modifications have no doubt become apparent to those skilled in the art after reading the above disclosure. Accordingly, it is intended that the appended claims be interpreted as covering all alternations and modifications as falling within the spirit and scope of the invention. Although the present invention has been described by exemplifying the presently preferred embodiments, it shall be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as falling within the true spirit and scope of the invention.

What is claimed is:

1. A mirror device comprising:
a plurality of mirror elements, each comprising a mirror for reflecting light projected from a light source;
a hinge disposed on a substrate under said mirror for supporting the mirror, and an electrode disposed at a distance away from said hinge on said substrate under said mirror for controlling a deflection direction of the mirror is attached to a surface of said mirror on an edge or a corner of said mirror; and
said hinge further includes a first and a second branches separated by a gap wherein said first branch is attached to said surface of said mirror and said second branch is attached to an adjacent mirror.

2. The mirror device according to claim 1, wherein:
said electrode functioning as address electrodes for receiving control circuit signals for selecting and activating said mirror.

3. The mirror device according to claim 1, further comprising:
a stopper disposed under said mirror on said substrate for contacting and stopping said mirror from deflecting beyond a predefined maximum declined angle.

4. A mirror device, comprising:
a mirror element comprising a mirror for reflecting a light projected from a light source,
a plurality of hinges disposed on a substrate each attaching via a support layer to a bottom surface of said mirror for supporting said mirror thereon wherein said support layer is shaped with a cutoff portions at respective connection parts with said hinges;
an electrode disposed on the substrate for applying a voltage for controlling a deflection direction of the mirror; and
at least one side of the cutoff portions is oriented in a direction substantially parallel with an incident direction of the light emitted from the light source.

5. A mirror device comprising:
a mirror element comprising a mirror for reflecting a light projected from a light source,
a plurality of hinges disposed on a substrate each attaching via a support layer to a bottom surface of said mirror for supporting said mirror thereon wherein said support layer is shaped with a cutoff portions at respective connection parts with said hinges;
an electrode disposed on the substrate for applying a voltage for controlling a deflection direction of the mirror;
at least one side of the cutoff portions is oriented in a direction substantially parallel with an incident direction of the light emitted from the light source; and
the support layer extending as an integral support surface attached to at least said mirror and an adjacent mirror.

6. A mirror device, comprising:
a plurality of mirror elements, each comprising a mirror for reflecting light projected from a light source;
a hidden hinge connected to a hinge electrode disposed on a substrate for supporting the mirror; and
the hinge electrode is shared between said mirror and an adjacent mirror.

7. The mirror device according to claim 6, wherein:
the hinge electrode is disposed under a gap of between adjacent mirrors.

8. A mirror device, comprising:
a plurality of mirror elements, each comprising a mirror for reflecting a light projected from a light source;
a stopper disposed on a substrate for contacting the mirror when inclined to a predefined maximum declined angle; and
the stopper is shared between said mirror and an adjacent mirror.

9. The mirror device according to claim 8, wherein:
the stopper is disposed under a gap of between said mirror and said adjacent mirror.

10. A mirror device comprising:
a plurality of mirror elements each comprising a mirror for reflecting an illumination light emitted from a light source;
a plurality of hinges disposed on a substrate each attaching to a bottom surface on a corner or a edge of said mirror for supporting the mirror;
a plurality of electrodes disposed on said substrate for applying a voltage for controlling a deflection direction of the mirrors;
a plurality of stoppers disposed on said substrate for contacting said mirror inclining thereto thus stopping said mirror from further deflecting beyond a predefined maximum inclining angle relative to a horizontal state of the mirror; and
said stopper is disposed near a deflection axis of said mirror and also near a location on said substrate under a gap of between said mirror and said adjacent mirror whereby said stopper is shared between said mirror and said adjacent mirror.

* * * * *